(12) United States Patent
Liang

(10) Patent No.: US 10,318,131 B2
(45) Date of Patent: Jun. 11, 2019

(54) METHOD FOR SCALING DOWN EFFECTIVE DISPLAY AREA OF SCREEN, AND MOBILE TERMINAL

(71) Applicant: Huawei Technologies Co., Ltd., Shenzhen (CN)

(72) Inventor: Desheng Liang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 145 days.

(21) Appl. No.: 15/540,779

(22) PCT Filed: Dec. 29, 2014

(86) PCT No.: PCT/CN2014/095253
§ 371 (c)(1),
(2) Date: Jun. 29, 2017

(87) PCT Pub. No.: WO2016/106477
PCT Pub. Date: Jul. 7, 2016

(65) Prior Publication Data
US 2018/0004402 A1 Jan. 4, 2018

(51) Int. Cl.
*G06F 3/0484* (2013.01)
*G06F 3/0488* (2013.01)
(Continued)

(52) U.S. Cl.
CPC ........ *G06F 3/04845* (2013.01); *G06F 1/1694* (2013.01); *G06F 3/0484* (2013.01); *G06F 3/0488* (2013.01); *G06F 3/0346* (2013.01)

(58) Field of Classification Search
CPC .................................................. G06F 3/04845
(Continued)

(56) References Cited

U.S. PATENT DOCUMENTS 10,149,164 B1* 12/2018 Kim ................. H04M 1/72563
2013/0120464 A1 5/2013 Wei et al.
(Continued)

FOREIGN PATENT DOCUMENTS

CN 101471999 A 7/2009
CN 102479041 A 5/2012
(Continued)

OTHER PUBLICATIONS

Foreign Communication From A Counterpart Application, European Application No. 14909290.0, Extended European Search Report dated Dec. 19, 2017, 8 pages.
(Continued)

*Primary Examiner* — William D Titcomb
(74) *Attorney, Agent, or Firm* — Conley Rose, P.C.

(57) ABSTRACT

Embodiments of the present disclosure disclose a method for scaling down an effective display area of a screen, and a mobile terminal, to continuously scale down an effective display area of a screen according to a user's requirement. The method in the embodiments of the present disclosure includes: displaying, by a mobile terminal, first content; when an obtained first operation satisfies a preset condition, sensing a second operation; determining, according to a preset correspondence, a scale-down proportion corresponding to the second operation; and continuously scaling down an effective display area of a screen of the mobile terminal according to the scale-down proportion such that the first content is displayed on a scaled-down effective display area.

19 Claims, 12 Drawing Sheets

(51) Int. Cl.
*G06F 1/16* (2006.01)
*G06F 3/0346* (2013.01)

(58) Field of Classification Search
USPC .......................................................... 715/700
See application file for complete search history.

(56) References Cited

U.S. PATENT DOCUMENTS

| | | | |
|---|---|---|---|
| 2013/0215060 A1* | 8/2013 | Nakamura | G06F 1/1626 345/173 |
| 2014/0218409 A1* | 8/2014 | Kawatani | G06T 11/00 345/670 |
| 2014/0267057 A1* | 9/2014 | Zhao | G06F 1/1694 345/169 |
| 2014/0351761 A1* | 11/2014 | Bae | G06F 3/04817 715/835 |
| 2014/0362119 A1 | 12/2014 | Freund et al. | |
| 2014/0380209 A1* | 12/2014 | Tsukamoto | G06F 3/0484 715/763 |
| 2015/0046825 A1* | 2/2015 | Li | G06F 3/0481 715/728 |
| 2015/0237187 A1 | 8/2015 | Kim et al. | |

FOREIGN PATENT DOCUMENTS

| | | |
|---|---|---|
| CN | 102662616 A | 9/2012 |
| CN | 103105997 A | 5/2013 |
| CN | 104049859 A | 9/2014 |
| EP | 2806339 A1 | 11/2014 |

OTHER PUBLICATIONS

Machine Translation and Abstract of Chinese Publication No. CN102479041, May 30, 2012, 8 pages.
Foreign Communication From A Counterpart Application, PCT Application No. PCT/CN2014/095253, English Translation of International Search Report dated Oct. 10, 2015, 2 pages.
Foreign Communication From A Counterpart Application, PCT Application No. PCT/CN2014/095253, English Translation of Written Opinion dated Oct. 10, 2015, 5 pages.
Machine Translation and Abstract of Chinese Publication No. CN101471999, dated Jul. 1, 2009, 11 pages.
Machine Translation and Abstract of Chinese Publication No. CN102662616, dated Sep. 12, 2012, 12 pages.
Foreign Communication From a Counterpart Application, Chinese Application No. 201480081832.9, Chinese Office Action dated Mar. 22, 2019, 17 pages.

* cited by examiner

Up-down levelness of a screen is 15 degrees

METHOD FOR SCALING DOWN EFFECTIVE DISPLAY AREA OF SCREEN, AND MOBILE TERMINAL

CROSS-REFERENCE TO RELATED APPLICATIONS

This application is a National Stage of International Application No. PCT/CN2014/095253, filed on Dec. 29, 2014, which is hereby incorporated by reference in its entirety.

TECHNICAL FIELD

The present disclosure relates to the communications field, and in particular, to a method for scaling down an effective display area of a screen, and a mobile terminal.

BACKGROUND

Mobile terminals with touchscreens, for example, mobile phones or tablet computers facilitate operations of people and are trending towards big screens. However, in some application scenarios, for example, when a user is on a bus or when a user is walking, two hands cannot conveniently operate a mobile terminal. In addition, because a screen is relatively large, the entire screen is not within the reach of a single hand during an operation.

Currently, a touch-control function may be added to a frame of a mobile terminal, to control scaling of a display area of a screen. However, scaling can be performed only on an image on a display area of a screen, a particular size can be obtained by means of scaling only at a fixed proportion, and a display area obtained by means of scaling cannot be within the reach of single hands of all users.

SUMMARY

Embodiments of the present disclosure provide a method for scaling down an effective display area of a screen, and a mobile terminal, to continuously scale down an effective display area of a screen according to a user's requirement.

A first aspect of the embodiments of the present disclosure provides a method for scaling down an effective display area of a screen, including displaying, by a mobile terminal, first content, obtaining, by the mobile terminal, a first operation, where the first operation is an operation performed by a single finger of a user on the mobile terminal, when the first operation satisfies a preset condition, sensing, by the mobile terminal, a second operation, where the second operation is a continuous operation performed by the user on the mobile terminal, determining, by the mobile terminal according to a preset correspondence, a scale-down proportion corresponding to the second operation, and continuously scaling down, by the mobile terminal, an effective display area of a screen of the mobile terminal according to the scale-down proportion such that the first content is displayed on a scaled-down effective display area.

With reference to the first aspect of the embodiments of the present disclosure, in a first implementation manner of the first aspect of the embodiments of the present disclosure, the second operation is a continuous operation of a single finger of the user on a second particular area of the mobile terminal, and the preset correspondence is a correspondence between an extent of a continuous movement of the finger on the second particular area and a scaling proportion, the sensing, by the mobile terminal, a second operation includes sensing, by the mobile terminal, the continuous operation of the single finger of the user on the second particular area, and determining the extent of the continuous movement of the finger on the second particular area, and the determining, by the mobile terminal according to a preset correspondence, a scale-down proportion corresponding to the second operation includes determining, by the mobile terminal according to the preset correspondence, a scale-down proportion corresponding to the extent of the continuous movement of the finger on the second particular area.

With reference to the first aspect of the embodiments of the present disclosure, in a second implementation manner of the first aspect of the embodiments of the present disclosure, the second operation is an operation for changing an up-down levelness of the screen of the mobile terminal, the up-down levelness represents an angle between a horizontal line and a line that is perpendicular to an upper edge and a lower edge of the mobile terminal, and the preset correspondence is a correspondence between an angle change of the up-down levelness and a scale proportion, the sensing, by the mobile terminal, a second operation includes sensing, by the mobile terminal, the operation for changing the up-down levelness of the mobile terminal, and determining the angle change of the up-down levelness, and the determining, by the mobile terminal according to a preset correspondence, a scale-down proportion corresponding to the second operation includes determining, by the mobile terminal according to the preset correspondence, the scale-down proportion corresponding to the angle change of the up-down levelness.

With reference to the first aspect of the embodiments of the present disclosure, in a third implementation manner of the first aspect of the embodiments of the present disclosure, the determining, by the mobile terminal according to a preset correspondence, a scale-down proportion corresponding to the second operation includes when a direction pointed by the second operation is a first direction, determining, by the mobile terminal according to the preset correspondence, the scale-down proportion corresponding to the second operation, and the method further includes when the direction pointed by the second operation is a second direction, determining, by the mobile terminal according to the preset correspondence, a scale-up proportion corresponding to the second operation, where the second direction is different from the first direction, and continuously scaling up, by the mobile terminal, the effective display area of the screen of the mobile terminal according to the scale-up proportion such that the same content is displayed on a scaled-up effective display area, where the effective display area can at most be scaled up to a size that is the same as that of the screen.

With reference to the first aspect of the embodiments of the present disclosure, in a fourth implementation manner of the first aspect of the embodiments of the present disclosure, after the step of continuously scaling down the effective display area of the screen of the mobile terminal, the method further includes when the mobile terminal receives a third operation, resetting, by the mobile terminal, the effective display area to a size that is the same as that of the screen, where the third operation is different from the first operation and the second operation.

With reference to the first aspect of the embodiments of the present disclosure, in a fifth implementation manner of the first aspect of the embodiments of the present disclosure, the method further includes receiving a fourth operation, where the fourth operation is used to correspond to a scale-up instruction or a scale-down instruction, the determining, by the mobile terminal according to a preset correspondence, a scale-down proportion corresponding to the second operation includes when the fourth operation corresponds to the scale-down instruction, determining, by the mobile terminal according to the preset correspondence, the scale-down proportion corresponding to the second operation, and the method further includes when the fourth operation corresponds to the scale-up instruction, determining, by the mobile terminal according to the preset correspondence, a scale-up proportion corresponding to the second operation, and continuously scaling up, by the mobile terminal, the effective display area of the screen of the mobile terminal according to the scale-up proportion such that the same content is displayed on a scaled-up effective display area, where the effective display area can at most be scaled up to a size that is the same as that of the screen.

With reference to any one of the first aspect of the embodiments of the present disclosure to the fifth implementation manner of the first aspect, in a sixth implementation manner of the first aspect of the embodiments of the present disclosure, after the first operation satisfies the preset condition, the method further includes monitoring, by the mobile terminal, a left-right levelness of the mobile terminal, where the left-right levelness represents an angle between the horizontal line and a line that is perpendicular to a left edge and a right edge of the mobile terminal, and in a range of 0 degree to 180 degrees, when the left-right levelness is less than 90 degrees, switching, by the mobile terminal, the effective display area of the screen to a lower left corner of the screen, or when the left-right levelness is greater than 90 degrees, switching, by the mobile terminal, the effective display area of the screen to a lower right corner of the screen.

With reference to any one of the first aspect of the embodiments of the present disclosure to the sixth implementation manner of the first aspect, in a seventh implementation manner of the first aspect of the embodiments of the present disclosure, the first operation is that the user constantly presses or performs floating touch on a first particular area at an edge of the screen of the mobile terminal, the obtaining, by the mobile terminal, a first operation includes obtaining, by the mobile terminal, the operation that the user constantly presses or performs floating touch on the first particular area at the edge of the screen of the mobile terminal, and determining first duration, where the first duration is duration for which the user constantly presses or performs floating touch on the first particular area at the edge of the screen of the mobile terminal, and before determining the first operation satisfies the preset condition, the method further includes determining, by the mobile terminal, whether the first duration is less than preset duration, and when determining that the first duration is not less than the preset duration, determining that the first operation satisfies the preset condition.

A second aspect of the embodiments of the present disclosure provides a mobile terminal, including a display module, configured to display first content, an obtaining module, configured to obtain a first operation, where the first operation is an operation performed by a single finger of a user on the mobile terminal, a sensing module, configured to when the first operation obtained by the obtaining module satisfies a preset condition, sense a second operation, where the second operation is a continuous operation performed by the user on the mobile terminal, a first determining module, configured to determine, according to a preset correspondence, a scale-down proportion corresponding to the second operation, and a scale-down module, configured to continuously scale down an effective display area of a screen of the mobile terminal according to the scale-down proportion such that the first content is displayed on a scaled-down effective display area.

With reference to the second aspect of the embodiments of the present disclosure, in a first implementation manner of the second aspect of the embodiments of the present disclosure, the second operation is a continuous operation of a single finger of the user on a second particular area of the mobile terminal, and the preset correspondence is a correspondence between an extent of a continuous movement of the finger on the second particular area and a scaling proportion, the sensing module is configured to sense the continuous operation of the single finger of the user on the second particular area, and determine the extent of the continuous movement of the finger on the second particular area, and the first determining module is configured to determine, according to the preset correspondence, a scale-down proportion corresponding to the extent of the continuous movement of the finger on the second particular area.

With reference to the second aspect of the embodiments of the present disclosure, in a second implementation manner of the second aspect of the embodiments of the present disclosure, the second operation is an operation for changing an up-down levelness of the screen of the mobile terminal, the up-down levelness represents an angle between a horizontal line and a line that is perpendicular to an upper edge and a lower edge of the mobile terminal, and the preset correspondence is a correspondence between an angle change of the up-down levelness and a scale proportion, the sensing module is configured to sense the operation for changing the up-down levelness of the mobile terminal, and determine the angle change of the up-down levelness, and the first determining module is configured to determine, according to the preset correspondence, the scale-down proportion corresponding to the angle change of the up-down levelness.

With reference to the second aspect of the embodiments of the present disclosure, in a third implementation manner of the second aspect of the embodiments of the present disclosure, the first determining module is configured to when a direction pointed by the second operation is a first direction, determine, according to the preset correspondence, the scale-down proportion corresponding to the second operation, and the mobile terminal further includes a second determining module, configured to when the direction pointed by the second operation is a second direction, determine, according to the preset correspondence, a scale-up proportion corresponding to the second operation, where the second direction is different from the first direction, and a scale-up module, configured to continuously scale up the effective display area of the screen of the mobile terminal according to the scale-up proportion such that the same content is displayed on a scaled-up effective display area, where the effective display area can at most be scaled up to a size that is the same as that of the screen.

With reference to the second aspect of the embodiments of the present disclosure, in a fourth implementation manner of the second aspect of the embodiments of the present disclosure, the mobile terminal further includes a reset module, configured to when a third operation is received, reset the effective display area to a size that is the same as that of the screen, where the third operation is different from the first operation and the second operation.

With reference to the second aspect of the embodiments of the present disclosure, in a fifth implementation manner of the second aspect of the embodiments of the present disclosure, the mobile terminal further includes a receiving module, configured to receive a fourth operation, where the fourth operation is used to determine whether the second operation corresponds to a scale-down instruction or a scale-up instruction, where the first determining module is configured to when the received fourth operation corresponds to the scale-down instruction, determine, according to the preset correspondence, the scale-down proportion corresponding to the second operation, and the mobile terminal further includes a third determining module, configured to when the received fourth operation corresponds to the scale-up instruction, determine a scale-up proportion corresponding to the second operation, where a second direction is different from a first direction, and a scale-up module, configured to continuously scale up the effective display area of the screen of the mobile terminal according to the scale-up proportion such that the same content is displayed on a scaled-up effective display area, where the effective display area can at most be scaled up to a size that is the same as that of the screen.

With reference to any one of the second aspect of the embodiments of the present disclosure to the fifth implementation manner of the second aspect, in a sixth implementation manner of the second aspect of the embodiments of the present disclosure, the mobile terminal further includes a monitoring module, configured to when the first operation obtained by the obtaining module satisfies the preset condition, monitor a left-right levelness of the mobile terminal, where the left-right levelness represents an angle between the horizontal line and a line that is perpendicular to a left edge and a right edge of the mobile terminal, and a switching module, configured to in a range of 0 degree to 180 degrees, when the left-right levelness is less than 90 degrees, switch the effective display area of the screen to a lower left corner of the screen, or when the left-right levelness is greater than 90 degrees, switch the effective display area of the screen to a lower right corner of the screen.

With reference to any one of the second aspect of the embodiments of the present disclosure to the sixth implementation manner of the second aspect, in a seventh implementation manner of the second aspect of the embodiments of the present disclosure, the first operation is that the user constantly presses or performs floating touch on a first particular area at an edge of the screen of the mobile terminal, the obtaining module is configured to obtain the operation that the user constantly presses or performs floating touch on the first particular area at the edge of the screen of the mobile terminal, and determine first duration, where the first duration is duration for which the user constantly presses or performs floating touch on the first particular area at the edge of the screen of the mobile terminal, and the mobile terminal further includes a determining module, configured to determine whether the first duration determined by the obtaining module is less than preset duration, and a triggering module, configured to when the determining module determines that the first duration is not less than the preset duration and determines that the first operation satisfies the preset condition, trigger the sensing module.

A third aspect of the embodiments of the present disclosure provides a mobile terminal, including an input apparatus, an output apparatus, a processor, and a memory, where the processor is configured to perform the following steps by invoking an operation instruction stored in the memory displaying first content, obtaining a first operation, where the first operation is an operation performed by a single finger of a user on the mobile terminal, when the first operation satisfies a preset condition, sensing a second operation, where the second operation is a continuous operation performed by the user on the mobile terminal, determining, according to a preset correspondence, a scale-down proportion corresponding to the second operation, and continuously scaling down an effective display area of a screen of the mobile terminal according to the scale-down proportion such that the first content is displayed on a scaled-down effective display area.

With reference to the third aspect of the embodiments of the present disclosure, in a first implementation manner of the third aspect of the embodiments of the present disclosure, the second operation is a continuous operation of a single finger of the user on a second particular area of the mobile terminal, and the preset correspondence is a correspondence between an extent of a continuous movement of the finger on the second particular area and a scaling proportion, when performing the step of sensing the second operation, the processor performs the following steps sensing the continuous operation of the single finger of the user on the second particular area, and determining the extent of the continuous movement of the finger on the second particular area, and when performing the step of determining, according to the preset correspondence, the scaling proportion corresponding to the second operation, the processor performs the following step determining, according to the preset correspondence, a scale-down proportion corresponding to the extent of the continuous movement of the finger on the second particular area.

With reference to the third aspect of the embodiments of the present disclosure, in a second implementation manner of the third aspect of the embodiments of the present disclosure, the second operation is an operation for changing an up-down levelness of the screen of the mobile terminal, the up-down levelness represents an angle between a horizontal line and a line that is perpendicular to an upper edge and a lower edge of the mobile terminal, and the preset correspondence is a correspondence between an angle change of the up-down levelness and a scale proportion, when performing the step of sensing the second operation, the processor performs the following steps sensing the operation for changing the up-down levelness of the mobile terminal, and determining the angle change of the up-down levelness, and when performing the step of determining, according to the preset correspondence, the scaling proportion corresponding to the second operation, the processor performs the following step determining, according to the preset correspondence, the scaling proportion corresponding to the angle change of the up-down levelness.

With reference to the third aspect of the embodiments of the present disclosure, in a third implementation manner of the third aspect of the embodiments of the present disclosure, when performing the step of determining, according to the preset correspondence, the scale-down proportion corresponding to the second operation, the processor performs the following step when a direction pointed by the second operation is a first direction, determining, according to the preset correspondence, the scale-down proportion corresponding to the second operation, and the processor is further configured to perform the following steps when the direction pointed by the second operation is a second direction, determining, according to the preset correspondence, a scale-up proportion corresponding to the second operation, where the second direction is different from the first direction, and continuously scaling up the effective display area of the screen of the mobile terminal according to the scale-up proportion such that the same content is displayed on a scaled-up effective display area, where the effective display area can at most be scaled up to a size that is the same as that of the screen.

With reference to the third aspect of the embodiments of the present disclosure, in a fourth implementation manner of the third aspect of the embodiments of the present disclosure, the processor is further configured to perform the following step when a third operation is received, resetting the effective display area to a size that is the same as that of the screen, where the third operation is different from the first operation and the second operation.

With reference to the third aspect of the embodiments of the present disclosure, in a fifth implementation manner of the third aspect of the embodiments of the present disclosure, the processor is further configured to perform the following steps receiving a fourth operation, where the fourth operation is used to determine whether the second operation corresponds to a scale-down instruction or a scale-up instruction, when performing the step of determining, according to the preset correspondence, a scale-down proportion corresponding to an angle change of an up-down levelness, the processor performs the following step when the received fourth operation corresponds to the scale-down instruction, determining, according to the preset correspondence, the scale-down proportion corresponding to the second operation, and the processor is further configured to perform the following steps when the received fourth operation corresponds to the scale-up instruction, determining a scale-up proportion corresponding to the second operation, where a second direction is different from a first direction, and continuously scaling up the effective display area of the screen of the mobile terminal according to the scale-up proportion such that the same content is displayed on a scaled-up effective display area, where the effective display area can at most be scaled up to a size that is the same as that of the screen.

With reference to any one of the third aspect of the embodiments of the present disclosure to the fifth implementation manner of the third aspect, in a sixth implementation manner of the third aspect of the embodiments of the present disclosure, the processor is further configured to perform the following steps when the obtained first operation satisfies the preset condition, monitoring a left-right levelness of the mobile terminal, where the left-right levelness represents an angle between the horizontal line and a line that is perpendicular to a left edge and a right edge of the mobile terminal, and in a range of 0 degree to 180 degrees, when the left-right levelness is less than 90 degrees, switching the effective display area of the screen to a lower left corner of the screen, or when the left-right levelness is greater than 90 degrees, switching the effective display area of the screen to a lower right corner of the screen.

With reference to any one of the third aspect of the embodiments of the present disclosure to the sixth implementation manner of the third aspect, in a seventh implementation manner of the third aspect of the embodiments of the present disclosure, the first operation is that the user constantly presses or performs floating touch on a first particular area at an edge of the screen of the mobile terminal, when performing the step of obtaining the first operation, the processor performs the following steps obtaining the operation that the user constantly presses or performs floating touch on the first particular area at the edge of the screen of the mobile terminal, and determining first duration, where the first duration is duration for which the user constantly presses or performs floating touch on the first particular area at the edge of the screen of the mobile terminal, and the processor is further configured to perform the following steps determining whether the determined first duration is less than preset duration, and when determining that the first duration is not less than the preset duration, determining that the first operation satisfies the preset condition.

As can be seen from the foregoing technical solutions, the embodiments of the present disclosure have the following advantages in the embodiments of the present disclosure, a mobile terminal displays first content, when an obtained first operation satisfies a preset condition, senses a second operation, determines, according to a preset correspondence, a scale-down proportion corresponding to the second operation, and continuously scales down an effective display area of a screen of the mobile terminal according to the scale-down proportion such that the first content is displayed on a scaled-down effective display area. The second operation is a continuous operation performed by a user on the mobile terminal. The continuous operation may be freely controlled by the user. Correspondingly, the scale-down proportion corresponding to the second operation may be freely controlled by the user such that a scaling proportion of the effective display area of the screen is continuously controlled according to a requirement of the user. Further, because the first operation is an operation performed by a single finger of the user on the mobile terminal, the operation can be conveniently performed by a single finger of the user. Then the effective display area is scaled down, which is equivalent to changing a big screen that is not convenient for a single-hand operation into a small screen that is convenient for a single-hand operation, thereby implementing a complete single-hand operation on the screen of the mobile terminal. In addition, the scale-down proportion of the effective display area of the screen is freely controlled, therefore, a requirement that various users operate the mobile terminal using single hands can be satisfied.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by persons skilled in the art based on the embodiments of the present disclosure without creative efforts shall fall within the protection scope of the present disclosure.

Figure 1:
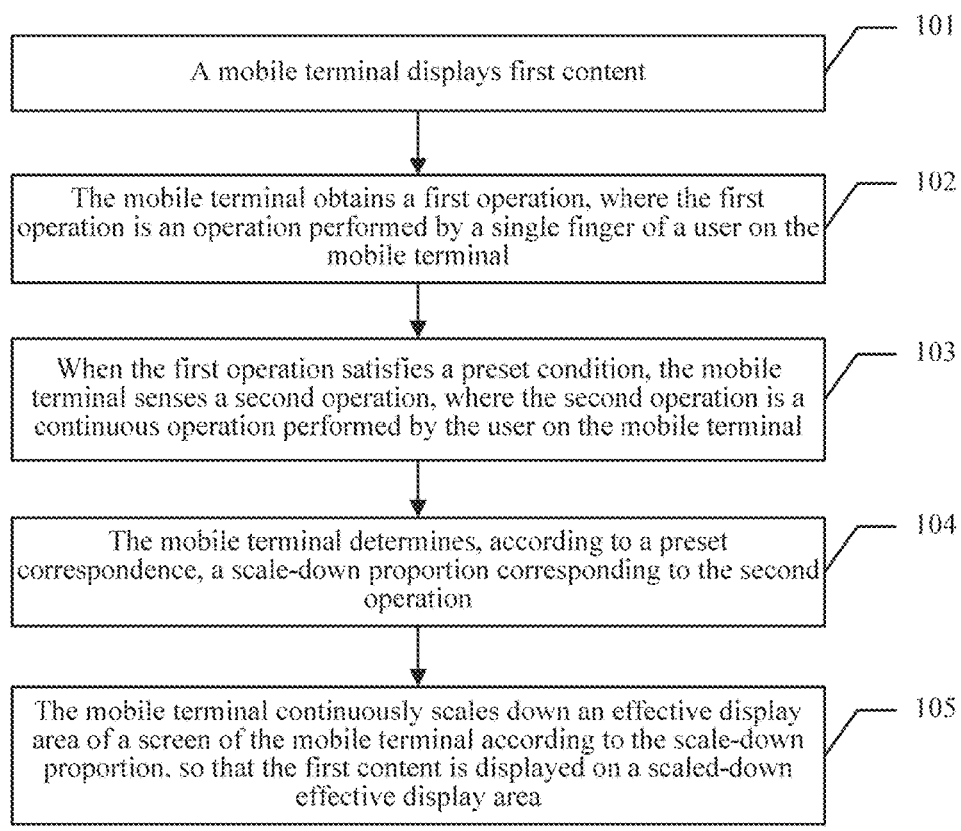
FIG. 1 is a schematic flowchart of a method for scaling down an effective display area of a screen according to an embodiment of the present disclosure.

Referring to FIG. 1, an embodiment of a method for scaling down an effective display area of a screen according to an embodiment of the present disclosure includes the following steps:

101: A mobile terminal displays first content.

The mobile terminal displays the first content. The first content is content displayed on an effective display area of a screen.

102: The mobile terminal obtains a first operation, where the first operation is an operation performed by a single finger of a user on the mobile terminal.

The mobile terminal obtains the operation performed by the single finger of the user on the mobile terminal. The operation is referred to as the first operation. A particular area may be touched by a finger (for example, a thumb) of the user that holds the mobile terminal. The obtained first operation is used to determine whether to trigger a subsequent step.

103: When the first operation satisfies a preset condition, the mobile terminal senses a second operation, where the second operation is a continuous operation performed by the user on the mobile terminal.

After the mobile terminal obtains the first operation, when the first operation satisfies the preset condition, the mobile terminal senses the second operation. The second operation is the continuous operation performed by the user on the mobile terminal, and the second operation is related to a scale-down proportion for scaling down the effective display area of the screen.

104: The mobile terminal determines, according to a preset correspondence, a scale-down proportion corresponding to the second operation.

After sensing the second operation, the mobile terminal determines, according to the preset correspondence, the scale-down proportion corresponding to the second operation.

It may be understood that the preset correspondence includes a correspondence between the second operation and the scale-down proportion.

105: The mobile terminal continuously scales down an effective display area of a screen of the mobile terminal according to the scale-down proportion such that the first content is displayed on a scaled-down effective display area.

After determining the scale-down proportion, the mobile terminal continuously scales down the effective display area of the screen of the mobile terminal according to the scale-down proportion such that the first content is displayed on the scaled-down effective display area.

It should be noted that scaling down of the effective display area of the screen is different from current scaling down of a display area of a screen or an image on a display area.

Scaling down the effective display area refers to scaling down a size of the effective display area, and an amount of content displayed on the effective display area is not affected. The amount of content on the effective display area before the effective display area is scaled down is completely the same as an amount of content on the effective display area after the effective display area is scaled down. As the effective display area is scaled down, a proportion at which the content is displayed is also scaled down at a same proportion. For example, a resolution of a screen of a mobile phone is 570 pixels by 870 pixels (570*870), and a size of an effective display area is also 570*870 when an image is displayed in full screen. After the effective display area is scaled down to 25 percentage (%) of the current effective display area, the size of the effective display area on the screen of the mobile phone is scaled down to 285 pixels by 435 pixels (285*435). Similarly, the image displayed on the effective display area is also scaled down to a size that is 25% of the original image at the same proportion, and is displayed on the scaled-down effective display area. A part on the screen except the effective display area cannot display the content, and may be set to black screen.

However, scaling down of a display area of a screen or an image on a display area does not change a size of an effective display area. Regardless of how scaling down is performed, a size of the effective display area that displays content on the screen is not changed, and only a proportion at which the content is displayed on the display area is changed. For example, a resolution of a screen of a mobile phone is 570*870, and an image is displayed in full screen. Currently, after a display area of the screen is scaled down to 25%, a size of the effective display area that can display the content on the screen is not changed, and is still 570*870, and only a size of the displayed image is changed and the image is displayed using a proportion of 25% herein. If the image is relatively large or is a map or the like, when the display proportion is scaled down to 25%, more content enters the display area for displaying. An amount of content displayed on the display area in this case is not equal to an amount of content displayed before scaling down. However, after the image on the display area is scaled up, compared with the image before scaling up, displayed content is reduced. Therefore, scaling down of the effective display area is completely different from scaling down of the display area of the screen or the image on the display area. In addition, after the displayed content is scaled down, if another content, for example, another application, is opened on a mobile terminal, the other content is displayed still at a size that is the same as that of the screen. If the effective display area is scaled down, when another content is opened, the other content is not displayed at a size that is the same as that of the screen, and can be displayed only at a size of the scaled-down effective display area.

It may be understood that step 103 to step 105 may be a continuous dynamic process. Because the second operation in step 103 is a continuous operation, as the second operation continues, the scale-down proportion corresponding to the second operation in step 104 may constantly change. Correspondingly, the mobile terminal may continuously scale down the effective display area according to changes of the scale-down proportion in step 105, until the second operation stops or pauses.

In this embodiment of the present disclosure, a mobile terminal displays first content, when an obtained first operation satisfies a preset condition, senses a second operation, determines, according to a preset correspondence, a scale-down proportion corresponding to the second operation, and continuously scales down an effective display area of a screen of the mobile terminal according to the scale-down proportion such that the first content is displayed on a scaled-down effective display area. The second operation is a continuous operation performed by a user on the mobile terminal. The continuous operation may be freely controlled by the user. Correspondingly, the scale-down proportion corresponding to the second operation may be freely controlled by the user such that a scaling proportion of the effective display area of the screen is continuously controlled according to a requirement of the user. Further, because the first operation is an operation performed by a single finger of the user on the mobile terminal, the operation can be conveniently performed by a single finger of the user. Then the effective display area is scaled down, which is equivalent to changing a big screen that is not convenient for a single-hand operation into a small screen that is convenient for a single-hand operation, thereby implementing a complete single-hand operation on the screen of the mobile terminal. In addition, the scale-down proportion of the effective display area of the screen is freely controlled, therefore, a requirement that various users operate the mobile terminal using single hands can be satisfied.

In the foregoing embodiment, the first operation obtained in step 101 is used to determine whether to trigger a subsequent step. After the subsequent step is triggered, steps 102 to 104 are a continuous process of dynamically adjusting the effective display area of the screen, and steps 102 to 104 may be defined as a mode for adjusting the effective display area. In this mode, a scaling proportion may be determined according to the second operation to adjust the effective display area. The first operation in step 101 may be considered as an operation for triggering the mode for adjusting the effective display area.

In an actual application, both the first operation and the second operation can be set to many different operating manners.

Figure 2:
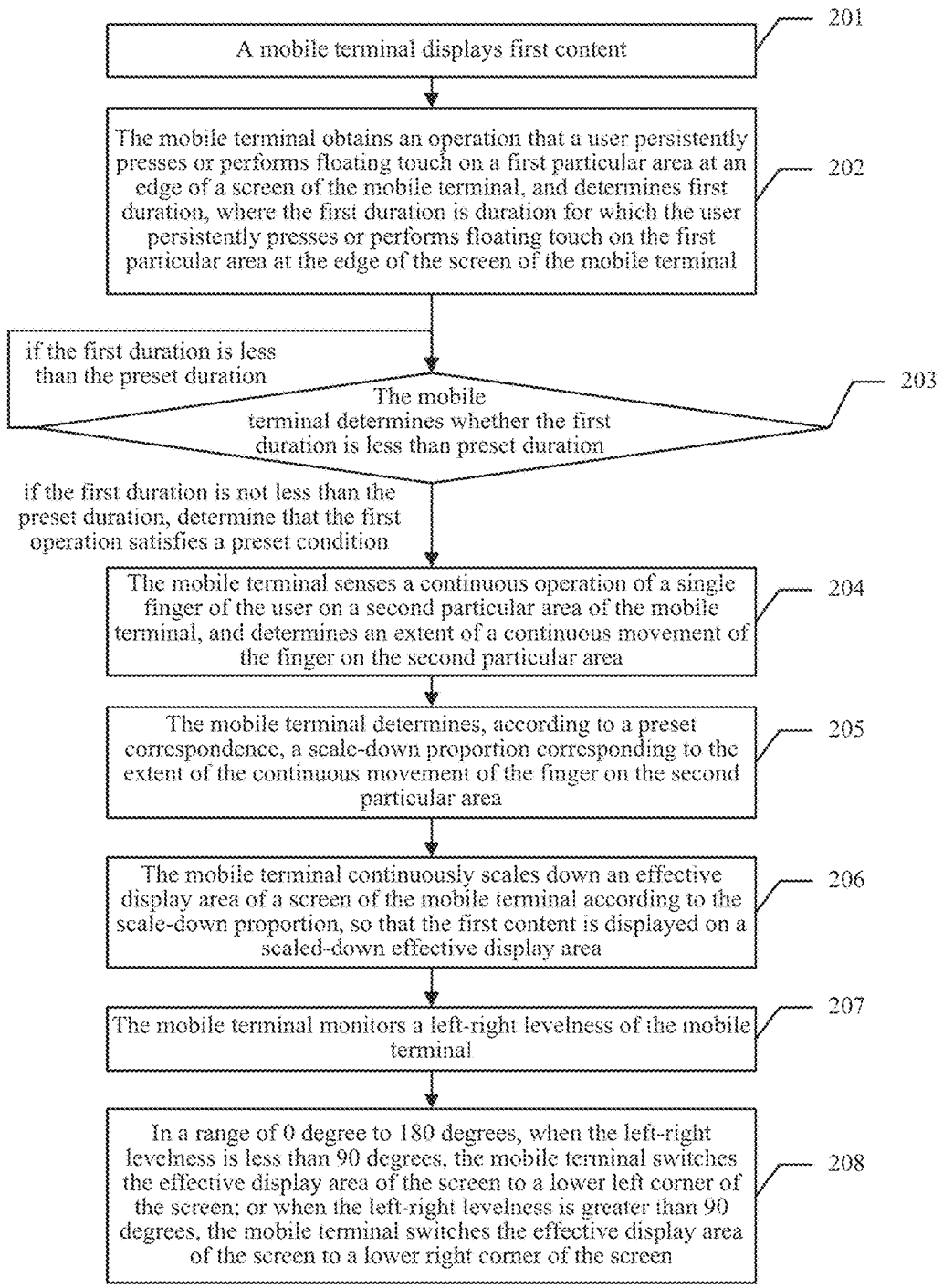
FIG. 2 is another schematic flowchart of a method for scaling down an effective display area of a screen according to an embodiment of the present disclosure.

The method for scaling down an effective display area of a screen in this embodiment of the present disclosure is described below. Referring to FIG. 2, another embodiment of an method for scaling down an effective display area of a screen in the embodiments of the present disclosure includes the following steps:

201: A mobile terminal displays first content.

Step 201 is similar to step 101, and details are not described herein again.

202: The mobile terminal obtains an operation that a user constantly presses or performs floating touch on a first particular area at an edge of a screen of the mobile terminal, and determines first duration, where the first duration is duration for which the user constantly presses or performs floating touch on the first particular area at the edge of the screen of the mobile terminal.

In this step, that the user constantly presses or performs floating touch on the first particular area at the edge of the screen of the mobile terminal is the first operation in the foregoing embodiment. The first particular area is at the edge of the screen of the mobile terminal. Therefore, the user may perform an operation using a single hand.

The mobile terminal may monitor the first particular area at the edge of the screen, collect an operation performed by a finger of the user on the first particular area, obtain the operation that the user constantly presses or performs floating touch on the first particular area at the edge of the screen of the mobile terminal, and determine the first duration. The first duration is duration for which the user constantly presses or performs floating touch on the first particular area at the edge of the screen of the mobile terminal.

In an embodiment, the duration of the first operation may be obtained using a touch technology or a floating technology. This is not limited herein.

Figure 3:
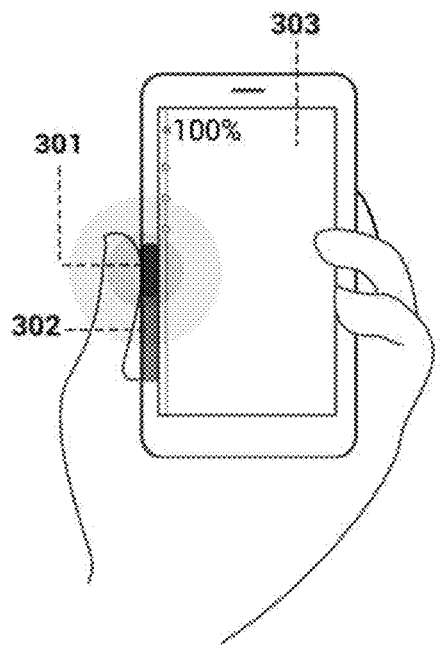
FIG. 3 is a schematic diagram of an embodiment of a method for scaling down an effective display area of a screen according to an embodiment of the present disclosure.

For example, 301 on a mobile terminal shown in FIG. 3 indicates the first particular area at the edge of the screen of the mobile terminal, and the mobile terminal may obtain duration for which a finger of the user presses on the first particular area, and use the duration as the first duration.

203: The mobile terminal determines whether the first duration is less than preset duration.

After determining the first duration, the mobile terminal determines whether the first duration is less than the preset duration.

If the first duration is not less than the preset duration, it is determined that the first operation satisfies a preset condition, and step 204 is triggered.

If the first duration is less than the preset duration, continue to perform step 202.

It may be understood that step 202 and step 203 are used to determine, using the first operation, whether to trigger a subsequent step. The first operation is that the user constantly presses or performs floating touch on the particular area at the edge of the screen of the mobile terminal. In an actual application, alternatively, another operation that can be completed by a single finger of the user may be used as the first operation, and another preset condition is set, to determine whether to trigger a subsequent operation.

Optionally, the first operation may be set to pressing a key. That the first operation satisfies the preset condition is, when a particular key on the mobile terminal or the screen is pressed, it is determined that the first operation satisfies the preset condition. Then a subsequent step is triggered.

Optionally, the first operation may be set to slide of a finger on a particular area. That the first operation satisfies the preset condition is when it is detected that a track at which a finger of the user moves conforms to a preset track, it is determined that the first operation satisfies the preset condition. Then a subsequent step is triggered.

Alternatively, there may be many other manners of setting the first operation and the preset condition corresponding to the first operation, which may be set and selected according to an actual need and is not limited herein.

204: The mobile terminal senses a continuous operation of a single finger of the user on a second particular area of the mobile terminal, and determines an extent of a continuous movement of the finger on the second particular area.

When determining that the first operation satisfies the preset condition, the mobile terminal senses the continuous operation of the single finger of the user on the second particular area of the mobile terminal, and determines the extent of the continuous movement of the finger on the second particular area.

In this step, the continuous operation of the single finger of the user on the second particular area of the mobile terminal is an implementation manner of the second operation in the foregoing embodiment.

It should be noted that in an actual application, the first particular area and the second particular area may be a same particular area or may be different particular areas, which may be set according to a structure of the mobile terminal and an actual need and is not limited herein.

For example, 302 on the mobile terminal shown in FIG. 3 indicates the second particular area of the mobile terminal. The mobile terminal may monitor a continuous movement of a single finger of the user on the second particular area, and determine an extent of a continuous movement of the finger on the second particular area.

205: The mobile terminal determines, according to a preset correspondence, a scale-down proportion corresponding to the extent of the continuous movement of the finger on the second particular area.

After determining the extent of the continuous movement of the finger on the second particular area, the mobile terminal determines, according to the preset correspondence, the scale-down proportion corresponding to the extent of the continuous movement of the finger on the second particular area.

The preset relationship includes a correspondence between the extent of the continuous movement of the finger on the second particular area and a scaling proportion. A specific proportion correspondence in values may be determined according to another factor such as an actual size of a particular area, a size of a screen of the mobile terminal, or a requirement of the user. For example, it may be set that a moving extent of 0.5 centimeters corresponds to scaling down to 90%. It is merely an example for the correspondence. Another proper proportion may be set according to an actual need, which is not limited herein.

It may be understood that the preset correspondence not only may be a direct correspondence between explicit values, but also may be a particular function. For example, after the moving extent is obtained, the moving extent is substituted into the particular function. A result obtained by solving the function is the scale-down proportion corresponding to the moving extent.

206: The mobile terminal continuously scales down an effective display area of a screen of the mobile terminal according to the scale-down proportion such that the first content is displayed on a scaled-down effective display area.

After determining the scale-down proportion, the mobile terminal continuously scales down the effective display area of the screen of the mobile terminal according to the scale-down proportion such that the first content is displayed on the scaled-down effective display area.

It may be understood that step 204 to step 206 may be a continuous dynamic process. Because the continuous movement of the finger on the particular area is a continuous operation in step 204, as the movement continues, the moving extent continuously changes. In step 205, the scale-down proportion corresponding to the extent of the continuous movement of the finger on the second particular area may also continuously change. Correspondingly, in step 206, the mobile terminal may continuously scale down the effective display area according to changes of the scale-down proportion, until the finger stops moving or pauses on the particular area.

Figure 4:
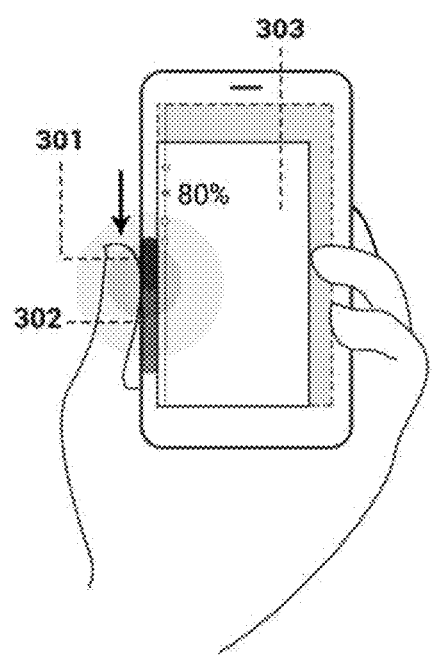
FIG. 4 is a schematic diagram of another embodiment of a method for scaling down an effective display area of a screen according to an embodiment of the present disclosure.
Figure 5:
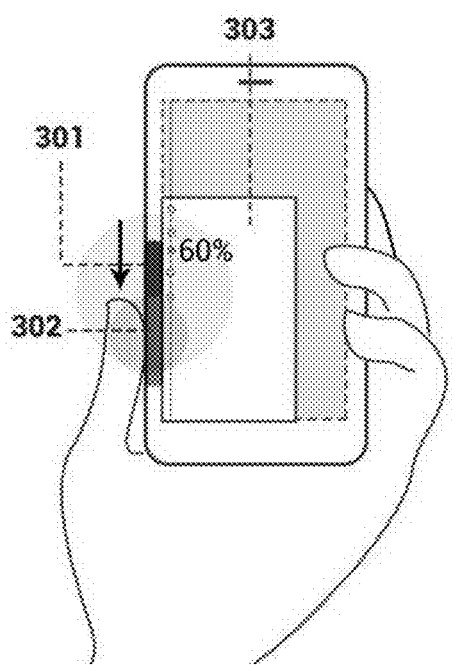
FIG. 5 is a schematic diagram of another embodiment of a method for scaling down an effective display area of a screen according to an embodiment of the present disclosure.

For example, as shown in FIG. 4, if a distance for which a finger of the user continuously moves is 1 centimeter in total since the moved distance is sensed, the scale-down proportion obtained by searching the preset correspondence is being scaled down to 80%, and the mobile terminal scales down the effective display area indicated by 303 to 80%. As shown in FIG. 5, if a finger of the user continues moving, and a distance of a continuous movement reaches 1.5 centimeters since the moved distance is sensed, the scale-down proportion obtained by searching the preset correspondence is being scaled down to 60%, and the mobile terminal scales down the effective display area indicated by 303 to 60%. It may be understood that when the continuous moved distance of 1 centimeter changes to the continuous moved distance of 1.5 centimeters, and the effective display area is scaled down to from 80% to 60%, scaling down of the effective display area may be a continuous process.

207: The mobile terminal monitors a left-right levelness of the mobile terminal.

When determining that the first operation satisfies the preset condition, the mobile terminal may further monitor the left-right levelness of the mobile terminal, where the left-right levelness represents an angle between a horizontal line and a line that is perpendicular to a left edge and a right edge of the mobile terminal.

It may be understood that when the mobile terminal is horizontally placed, the line perpendicular to the left edge and the right edge of the mobile terminal is parallel to the horizontal line. When the mobile terminal tilts to the left, the line perpendicular to the left edge and the right edge of the mobile terminal is at an acute angle to the horizontal line. From being parallel to the horizontal line to being perpendicular to the horizontal line, a changing range of the left-right levelness of the mobile terminal is from 0 degree to 90 degrees. When the mobile terminal tilts to the right, the line perpendicular to the left edge and the right edge of the mobile terminal is at an obtuse angle to the horizontal line. From being parallel to the horizontal line to being perpendicular to the horizontal line, a changing range of the left-right levelness of the mobile terminal is from 180 degrees to 90 degrees.

In an embodiment, the monitoring process may be completed by a gravity sensor, a gyro sensor, or the like in the mobile terminal, or may be obtained by collectively calculating data of multiple sensors. This is not limited herein.

208: In a range of 0 degree to 180 degrees, when the left-right levelness is less than 90 degrees, the mobile terminal switches the effective display area of the screen to a lower left corner of the screen, or when the left-right levelness is greater than 90 degrees, the mobile terminal switches the effective display area of the screen to a lower right corner of the screen.

After the mobile terminal monitors the left-right levelness, in the range of 0 degree to 180 degrees, when the left-right levelness is less than 90 degrees, the mobile terminal switches the effective display area of the screen to the lower left corner of the screen, or when the left-right levelness is greater than 90 degrees, the mobile terminal switches the effective display area of the screen to the lower right corner of the screen.

Figure 6:
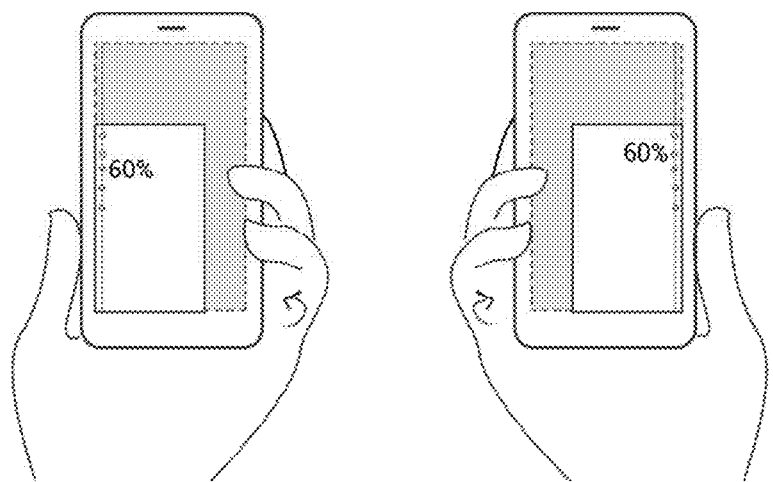
FIG. 6 is a schematic diagram of another embodiment of a method for scaling down an effective display area of a screen according to an embodiment of the present disclosure.

For example, as shown in FIG. 6, when the left-right levelness is less than 90 degrees, the mobile terminal switches the effective display area of the screen to the lower left corner of the screen, or when the left-right levelness is greater than 90 degrees, the mobile terminal switches the effective display area of the screen to the lower right corner of the screen.

In this embodiment of the present disclosure, a second operation is slide of a finger on a second particular area of a mobile terminal, and a preset correspondence is a correspondence between an extent and a direction of the slide and a scaling proportion. In this way, as long as the extent and the direction of the slide are controlled, scaling of an effective display area of a terminal screen of the mobile terminal may be dynamically controlled such that a scaling proportion of the effective display area of the screen is controlled in real time according to a user's requirement.

Figure 7:
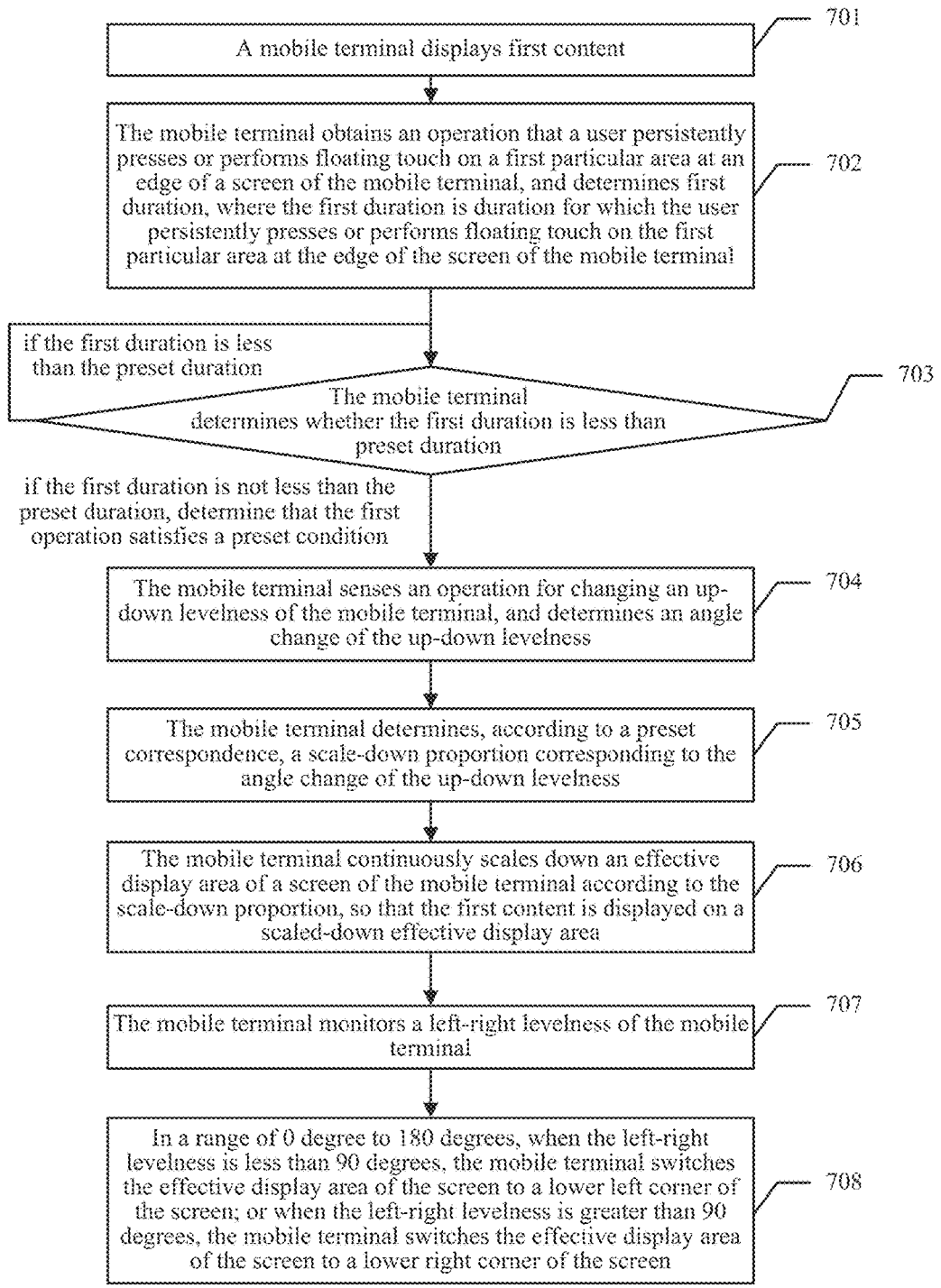
FIG. 7 is another schematic flowchart of a method for scaling down an effective display area of a screen according to an embodiment of the present disclosure.

In the foregoing embodiment, the second operation is a continuous operation of a single finger of the user on the second particular area of the mobile terminal. In an actual application, the second operation may be another operation. Referring to FIG. 7, another embodiment of a method for scaling down an effective display area of a screen in the embodiments of the present disclosure includes the following steps

701 to 703 are similar to steps 201 to 203, and details are not described herein again.

704: The mobile terminal senses an operation for changing an up-down levelness of the mobile terminal, and determines an angle change of the up-down levelness.

When determining that the first operation satisfies a preset condition, the mobile terminal senses the operation for changing the up-down levelness of the mobile terminal, and determines the angle change of the up-down levelness. The up-down levelness represents an angle between a horizontal line and a line that is perpendicular to an upper edge and a lower edge of the mobile terminal.

It may be understood that the angle change of the up-down levelness represents an angle difference between a current up-down levelness and an up-down levelness that exists when the mobile terminal starts sensing. When the mobile terminal is static, the up-down levelness stays unchanged. It may be set that the up-down levelness that exists when the mobile terminal starts sensing is 0 degree is used as a base value. When the mobile terminal tilts forward, the angle change of the up-down levelness is a negative value. When the mobile terminal tilts backward, the angle change of the up-down levelness is a positive value. Alternatively, it may be set that when the mobile terminal tilts backward, the angle change of the up-down levelness is a negative value, and that when the mobile terminal tilts forward, the angle change of the up-down levelness is a positive value. This is not limited herein.

In this step, the operation for changing the up-down levelness of the mobile terminal is another implementation manner of the second operation in the foregoing embodiment.

Figure 8:
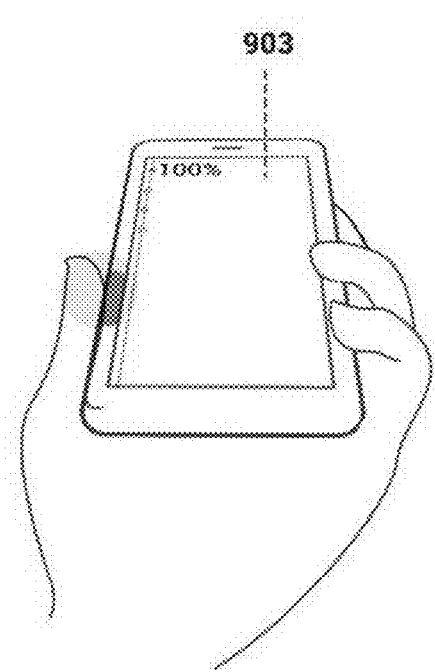
FIG. 8 is a schematic diagram of another embodiment of a method for scaling down an effective display area of a screen according to an embodiment of the present disclosure.

For example, a mobile terminal shown in FIG. 8 starts sensing the up-down levelness of the mobile terminal. In this case, the up-down levelness of the mobile terminal is a base value. A mobile terminal shown in FIG. 9 tilts forward by 15 degrees compared with the mobile terminal shown in FIG. 8. If it is set that when the mobile terminal tilts forward, an angle difference of the up-down levelness changes to a negative value, it may be determined that the angle change of the up-down levelness of the mobile terminal is −15 degrees.

705: The mobile terminal determines, according to a preset correspondence, a scale-down proportion corresponding to the angle change of the up-down levelness.

After determining the angle change of the up-down levelness, the mobile terminal determines, according to the preset correspondence, the scale-down proportion corresponding to the angle change.

The preset correspondence includes a correspondence between the angle change and the scale-down proportion. In an embodiment, a proportion correspondence in values may be determined according to another factor such as a size of the mobile terminal or a requirement of the user. For example, it may be set that the scaling proportion corresponding to the angle change of −15 degrees is to be scaled down to 80%. In this case, merely an example of the correspondence is used, and another proper proportion may be set according to an actual need, which is not limited herein.

It may be understood that the preset correspondence not only may be a direct correspondence between explicit values, but also may be a particular function. For example, after the angle change is obtained, the angle change is substituted into the particular function. A result obtained by solving the function is the scaling proportion corresponding to the angle change.

706: The mobile terminal continuously scales down an effective display area of a screen of the mobile terminal according to the scale-down proportion such that the first content is displayed on a scaled-down effective display area.

After determining the scale-down proportion, the mobile terminal continuously scales down the effective display area of the screen of the mobile terminal according to the scale-down proportion such that the first content is displayed on the scaled-down effective display area.

It may be understood that step 704 to step 706 may be a continuous dynamic process. Because the operation for changing the up-down levelness of the mobile terminal in step 704 is a continuous operation, as the up-down levelness changes, the angle change of the up-down levelness constantly changes. In step 705, the scale-down proportion corresponding to the angle change of the up-down levelness may also constantly change. Correspondingly, in step 706, the mobile terminal may scale the effective display area in real time according to changes of the scale-down proportion, until the up-down levelness stops changing.

Figure 9:
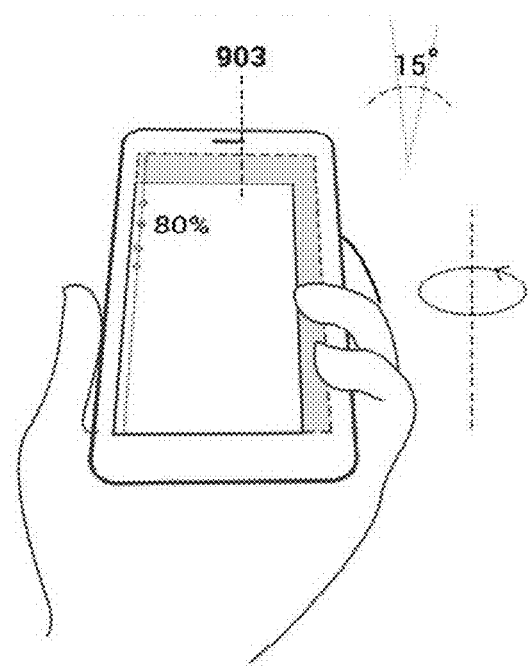
FIG. 9 is a schematic diagram of another embodiment of a method for scaling down an effective display area of a screen according to an embodiment of the present disclosure.
Figure 10:
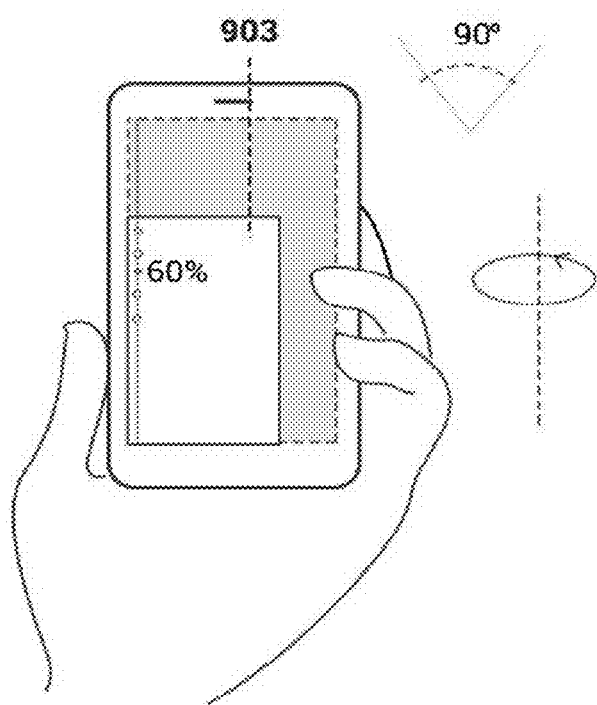
FIG. 10 is a schematic diagram of another embodiment of a method for scaling down an effective display area of a screen according to an embodiment of the present disclosure.

For example, as shown in FIG. 9, if the angle change of the up-down levelness is −15 since the up-down levelness is sensed, the scale-down proportion obtained by searching the preset correspondence is being scaled down to 80%, and the mobile terminal scales down the effective display area indicated by 903 to 80%. As shown in FIG. 10, if a finger of the user continues sliding down, the angle change of the up-down levelness reaches −90 degrees since the up-down levelness is sensed, the scale-down proportion obtained by searching the preset correspondence is being scaled down to 60%, and the mobile terminal scales down the effective display area indicated by 903 to 60%. It may be understood that when the angle change of the up-down levelness changes from −15 degrees to −90 degrees, and the effective display area is scaled down to from 80% to 60%, scaling down of the effective display area may be a continuous process.

707 and 708 are similar to steps 207 and 208, and details are not described herein again.

In this embodiment of the present disclosure, a second operation is an operation for changing an up-down levelness of a mobile terminal, and a preset correspondence is a correspondence between an angle change of the up-down levelness and a scale proportion. In this way, scaling of an effective display area of a terminal screen of the mobile terminal may be dynamically continuously controlled only using the angle change of the up-down levelness such that a scaling proportion of the effective display area of the screen is controlled in real time according to a user's requirement.

In the foregoing embodiments, the effective display area of the screen is scaled down. Therefore, in the foregoing embodiment shown in FIG. 2 or FIG. 7, the second operation may be a non-directional continuous operation, and the preset correspondence does not need to include any direction, and only needs to include a correspondence between a quantity relationship of the second operations and the scale-down proportion.

In an actual application, after an effective display area is scaled down, the effective display area may be scaled up, and can at most be scaled up to a size that is the same as a screen. There are many implementation manners.

First. Scaling up may be continuous scaling up, which may be implemented when a second operation is directional, or may be implemented when a second operation is non-directional.

1. The second operation is directional.

Figure 11:
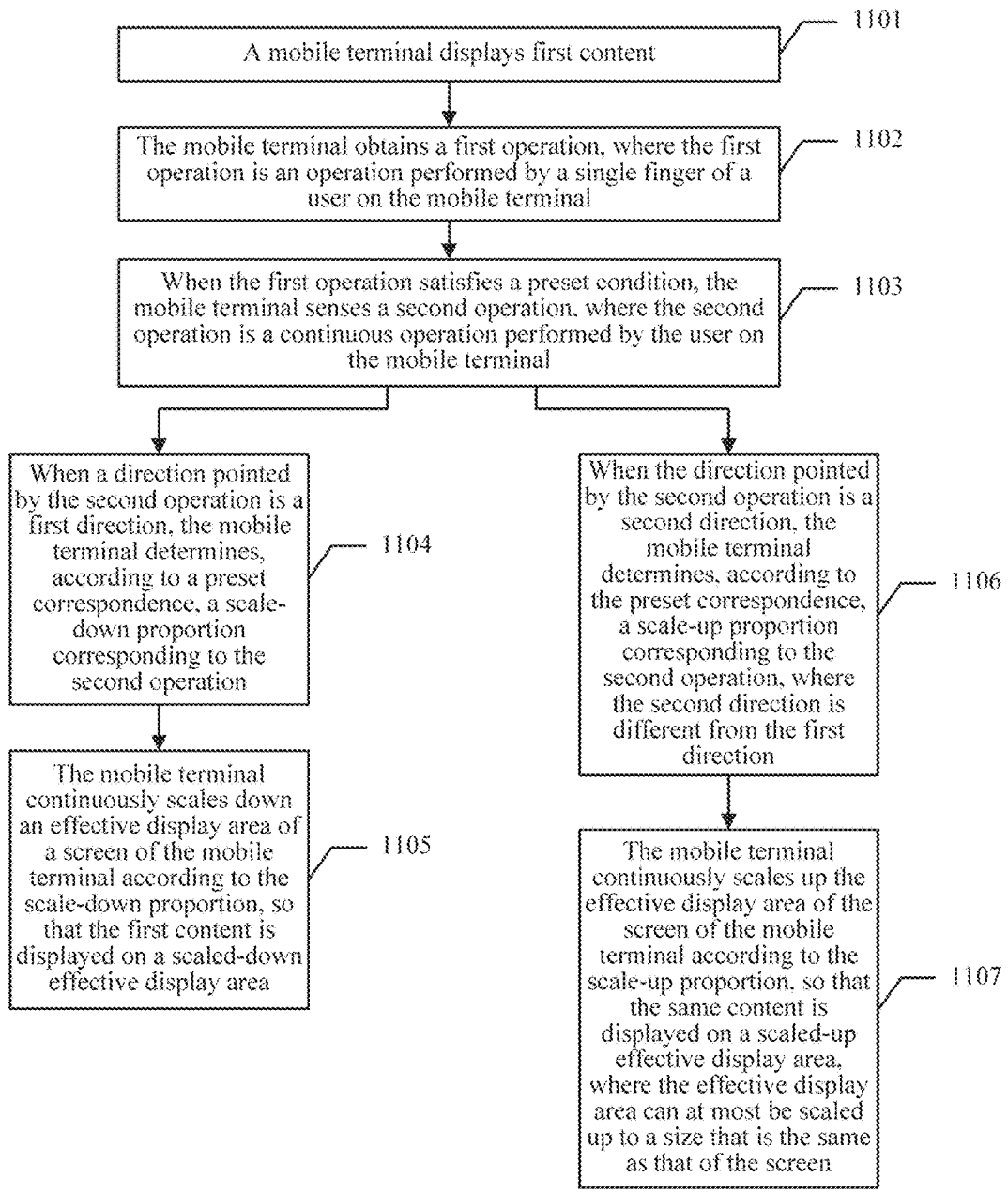
FIG. 11 is another schematic flowchart of a method for scaling down an effective display area of a screen according to an embodiment of the present disclosure.

Referring to FIG. 11, another embodiment of a method for scaling down an effective display area of a screen in the embodiments of the present disclosure includes.

1101: A mobile terminal displays first content.

1102: The mobile terminal obtains a first operation, where the first operation is an operation performed by a single finger of a user on the mobile terminal.

1103: When the first operation satisfies a preset condition, the mobile terminal senses a second operation, where the second operation is a continuous operation performed by the user on the mobile terminal.

Steps 1101 to 1103 are similar to steps 101 to 103, and details are not described herein again.

1104: When a direction pointed by the second operation is a first direction, the mobile terminal determines, according to a preset correspondence, a scale-down proportion corresponding to the second operation.

The second operation is directional. When the direction pointed by the second operation is the first direction, the mobile terminal determines, according to the preset correspondence, the scale-down proportion corresponding to the second operation.

For example, when the second operation is an operation of a continuous movement of a single finger on a particular area, it may be set that when the second operation moves downward, the second operation is a scale-down operation. In the preset correspondence, the second operation corresponds to the scale-down proportion.

1105: The mobile terminal continuously scales down an effective display area of a screen of the mobile terminal according to the scale-down proportion such that the first content is displayed on a scaled-down effective display area.

Step 1105 is similar to step 105, and details are not described herein again.

1106: When the direction pointed by the second operation is a second direction, the mobile terminal determines, according to the preset correspondence, a scale-up proportion corresponding to the second operation, where the second direction is different from the first direction.

When the direction pointed by the second operation is the second direction different from the first direction, the mobile terminal determines, according to the preset correspondence, the scale-up proportion corresponding to the second operation.

For example, when it is set that the second operation moves downward, the second operation corresponds to a scale-down proportion in the preset correspondence. In addition, it may be set that an upward direction of the second operation corresponds to a scale-up proportion in the preset correspondence.

1107: The mobile terminal continuously scales up the effective display area of the screen of the mobile terminal according to the scale-up proportion such that the same content is displayed on a scaled-up effective display area, where the effective display area can at most be scaled up to a size that is the same as that of the screen.

In this embodiment, the effective display area may be may be separately scaled down or scaled up using different directions pointed by the second operation, thereby further satisfying a requirement of the user, and improving human-machine interaction performance of the terminal.

2. The second operation is non-directional.

Before the second operation is sensed, another operation, for example, a fourth operation, may be first sensed. Different operations of the fourth operation may separately correspond to a scale-up instruction or a scale-down instruction, to determine whether a proportion obtained in the preset correspondence for the second operation that is subsequently sensed is a scale-down proportion or a scale-up proportion.

If the fourth operation corresponds to the scale-down instruction, the mobile terminal determines, according to the preset correspondence, the scale-down proportion corresponding to the second operation.

If the fourth operation corresponds to the scale-up instruction, the mobile terminal determines, according to the preset correspondence, the scale-up proportion corresponding to the second operation.

Second. The effective display area is not continuously scaled up, and is directly reset to a size that is the same as that of the screen.

A third operation may be set. The third operation is used to reset the effective display area to the size that is the same as that of the screen.

In the foregoing embodiments, after the mobile terminal continuously scales down the effective display area of the screen of the mobile terminal, when receiving the third operation, the mobile terminal resets the effective display area to the size that is the same as that of the screen. The third operation is different from the first operation and the second operation.

Figure 12:
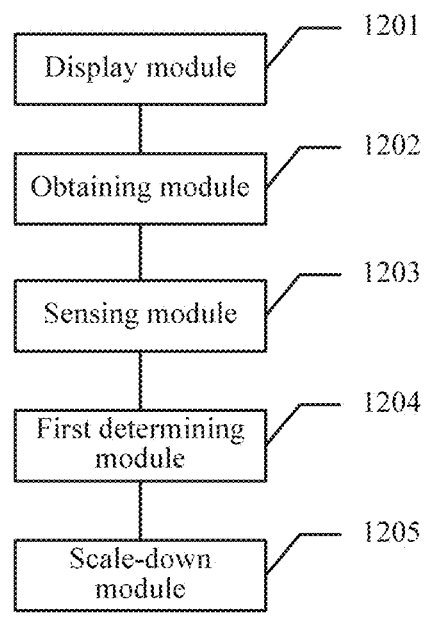
FIG. 12 is a schematic structural diagram of a mobile terminal according to an embodiment of the present disclosure.

A mobile terminal in an embodiment of the present disclosure is described below. Referring to FIG. 12, an embodiment of the mobile terminal in the embodiments of the present disclosure includes a display module 1201, configured to display first content, an obtaining module 1202, configured to obtain a first operation, where the first operation is an operation performed by a single finger of a user on the mobile terminal, a sensing module 1203, configured to when the first operation obtained by the obtaining module 1202 satisfies a preset condition, sense a second operation, where the second operation is a continuous operation performed by the user on the mobile terminal, a first determining module 1204, configured to determine, according to a preset correspondence, a scale-down proportion corresponding to the second operation, and a scale-down module 1205, configured to continuously scale down an effective display area of a screen of the mobile terminal according to the scale-down proportion such that the first content is displayed on a scaled-down effective display area.

In this embodiment of the present disclosure, the display module 1201 displays the first content. When the obtained first operation obtained by the obtaining module 1202 satisfies the preset condition, the sensing module 1203 senses the second operation. The first determining module 1204 determines, according to the preset correspondence, the scale-down proportion corresponding to the second operation. The scale-down module 1205 continuously scales down the effective display area of the screen of the mobile terminal according to the scale-down proportion such that the first content is displayed on the scaled-down effective display area. The second operation is a continuous operation performed by the user on the mobile terminal. The continuous operation may be freely controlled by the user. Correspondingly, the scale-down proportion corresponding to the second operation may be freely controlled by the user such that a scaling proportion of the effective display area of the screen is continuously controlled according to a requirement of the user. Further, because the first operation is an operation performed by a single finger of the user on the mobile terminal, the operation can be conveniently performed by a single finger of the user. Then the effective display area is scaled down, which is equivalent to changing a big screen that is not convenient for a single-hand operation into a small screen that is convenient for a single-hand operation, thereby implementing a complete single-hand operation on the screen of the mobile terminal. In addition, the scale-down proportion of the effective display area of the screen is freely controlled, therefore, a requirement that various users operate the mobile terminal using single hands can be satisfied.

In an actual application, the second operation may be multiple operations. Correspondingly, there also may be multiple preset correspondences.

Optionally, in another embodiment of the mobile terminal in the embodiments of the present disclosure, the second operation is a continuous operation of a single finger of the user on a second particular area of the mobile terminal, and the preset correspondence is a correspondence between an extent of a continuous movement of the finger on the second particular area and a scaling proportion.

The sensing module 1203 is configured to sense the continuous operation of the single finger of the user on the second particular area, and determine the extent of the continuous movement of the finger on the second particular area.

The first determining module 1204 is configured to determine, according to the preset correspondence, a scale-down proportion corresponding to the extent of the continuous movement of the finger on the second particular area.

In this embodiment of the present disclosure, the second operation the continuous operation of a single finger of the user on the second particular area of the mobile terminal, and the preset correspondence is a correspondence between the extent of the continuous movement of the finger and a scaling proportion on the second particular area. In this way, as long as the extent of the continuous movement is controlled, the scale-down proportion of the effective display area of a terminal screen of the mobile terminal may be continuously controlled such that a scale-down proportion of the effective display area of the screen is controlled in real time according to a user's requirement.

Optionally, in another embodiment of the mobile terminal in the embodiments of the present disclosure, the second operation is an operation for changing an up-down levelness of the screen of the mobile terminal, the up-down levelness represents an angle between a horizontal line and a line that is perpendicular to an upper edge and a lower edge of the mobile terminal, and the preset correspondence is a correspondence between an angle change of the up-down levelness and the scaling proportion.

The sensing module 1203 is configured to sense the operation for changing the up-down levelness of the mobile terminal, and determine the angle change of the up-down levelness.

The first determining module 1204 is configured to determine, according to the preset correspondence, the scale-down proportion corresponding to the angle change of the up-down levelness.

In this embodiment of the present disclosure, the second operation is the operation for changing the up-down levelness of the mobile terminal, and the preset correspondence is a correspondence between the angle change of the up-down levelness and a scale proportion. In this way, scaling down of an effective display area of a terminal screen of the mobile terminal may be dynamically continuously controlled only using the angle change of the up-down levelness, thereby implementing real-time control on the scale-down proportion of the effective display area of the screen according to the requirement of the user.

Figure 13:
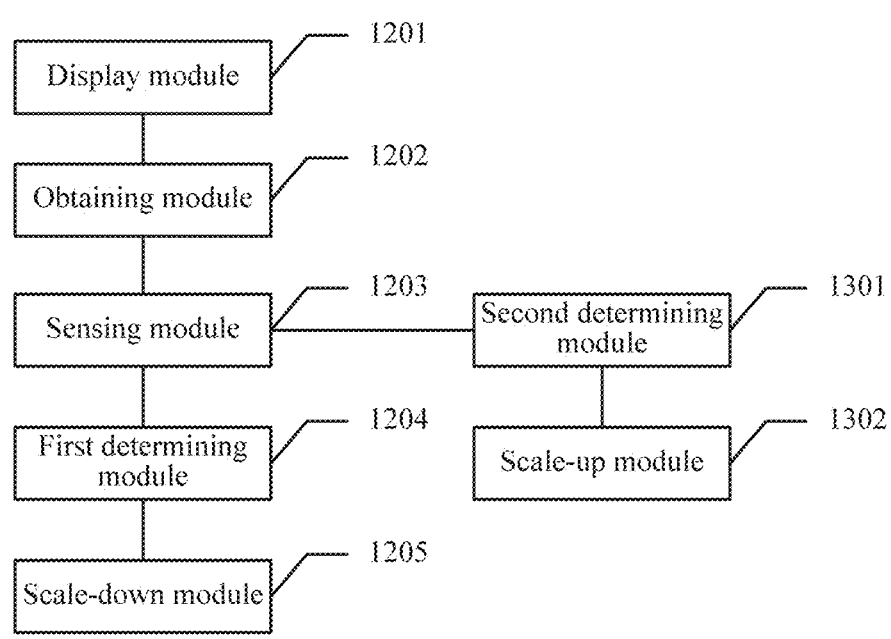
FIG. 13 is another schematic structural diagram of a mobile terminal according to an embodiment of the present disclosure.

In the foregoing embodiment, the effective display area is scaled down. In an actual application, after the effective display area is scaled down, the effective display area may be scaled up. There may be multiple specific implementation manners for scaling up the effective display area Optionally, referring to FIG. 13, in another embodiment of the mobile terminal in the embodiments of the present disclosure, the first determining module 1204 in the embodiment shown in FIG. 12 is configured to when the direction pointed by the second operation is a first direction, determine, according to the preset correspondence, the scale-down proportion corresponding to the second operation.

The mobile terminal may further include a second determining module 1301, configured to when the direction pointed by the second operation is a second direction, determine, according to the preset correspondence, a scale-up proportion corresponding to the second operation, where the second direction is different from the first direction, and a scale-up module 1302, configured to continuously scale up the effective display area of the screen of the mobile terminal according to the scale-up proportion such that the same content is displayed on a scaled-up effective display area, where the effective display area can at most be scaled up to a size that is the same as that of the screen.

In this embodiment, the first determining module 1204 and the second determining module 1301 may respectively determine the scale-down proportion and the scale-up proportion using different directions pointed by the second operation. The scale-down module 1205 and the scale-up module 1302 respectively scale down and scale up the effective display area, thereby further satisfying the requirement of the user, and improving man-machine interaction performance of the terminal.

Figure 14:
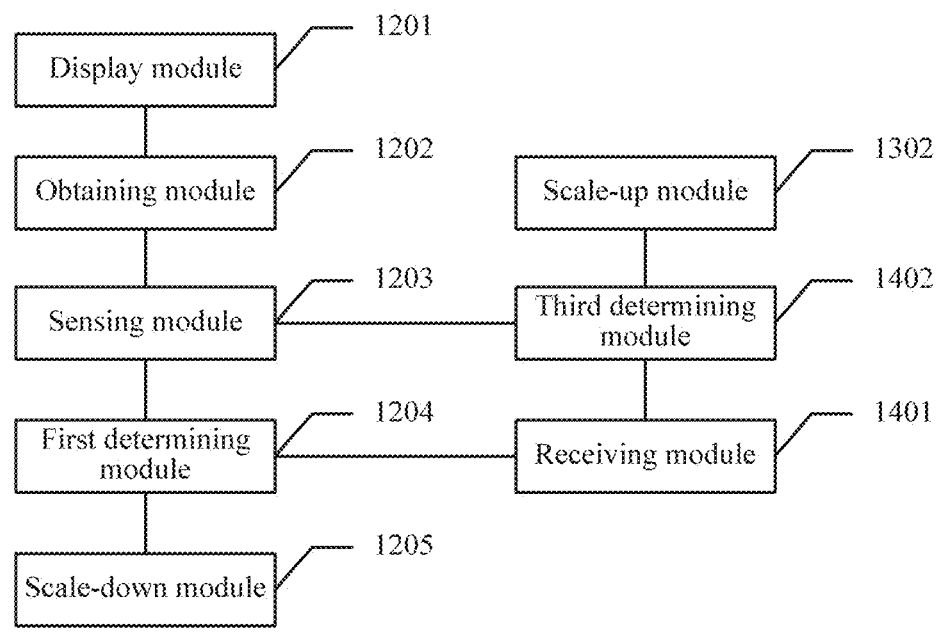
FIG. 14 is another schematic structural diagram of a mobile terminal according to an embodiment of the present disclosure.

Optionally, referring to FIG. 14, in another embodiment of the mobile terminal in the embodiments of the present disclosure, the mobile terminal described in FIG. 12 may further include a receiving module 1401, configured to receive a fourth operation, where the fourth operation is used to determine whether the second operation corresponds to a scale-down instruction or a scale-up instruction, where the first determining module 1204 is configured to when the fourth operation received by the receiving module 1401 corresponds to the scale-down instruction, determine, according to the preset correspondence, the scale-down proportion corresponding to the second operation.

The mobile terminal further includes a third determining module 1402, configured to when the fourth operation received by the receiving module 1401 corresponds to the scale-up instruction, determine a scale-up proportion corresponding to the second operation, where a second direction is different from a first direction, and a scale-up module 1302, configured to continuously scale up the effective display area of the screen of the mobile terminal according to the scale-up proportion such that the same content is displayed on a scaled-up effective display area, where the effective display area can at most be scaled up to a size that is the same as that of the screen.

In this embodiment, the first determining module 1204 and the third determining module 1402 may respectively determine the scale-down proportion and the scale-up proportion according to whether the fourth operation received by the receiving module 1401 corresponds to the scale-down instruction or the scale-up instruction. The scale-down module 1205 and the scale-up module 1302 respectively scale down and scale up the effective display area, thereby further satisfying the requirement of the user, and improving man-machine interaction performance of the terminal.

Figure 15:
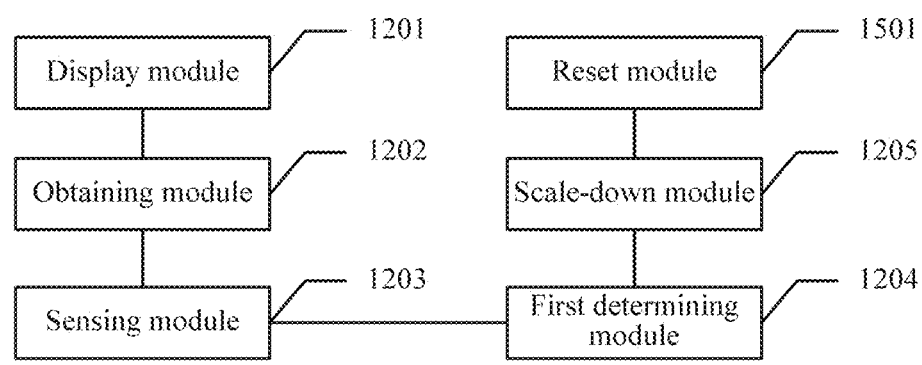
FIG. 15 is another schematic structural diagram of a mobile terminal according to an embodiment of the present disclosure.

Optionally, referring to FIG. 15, in another embodiment of the mobile terminal in the embodiments of the present disclosure, the foregoing mobile terminal may further include a reset module 1501, configured to when a third operation is received, reset the effective display area to a size that is the same as that of the screen, where the third operation is different from the first operation and the second operation.

In this embodiment, when receiving the third operation, the reset module 1501 may directly reset the effective display area to the size that is the same as that of the screen, thereby further improving the man-machine interaction performance of the terminal.

Figure 16:
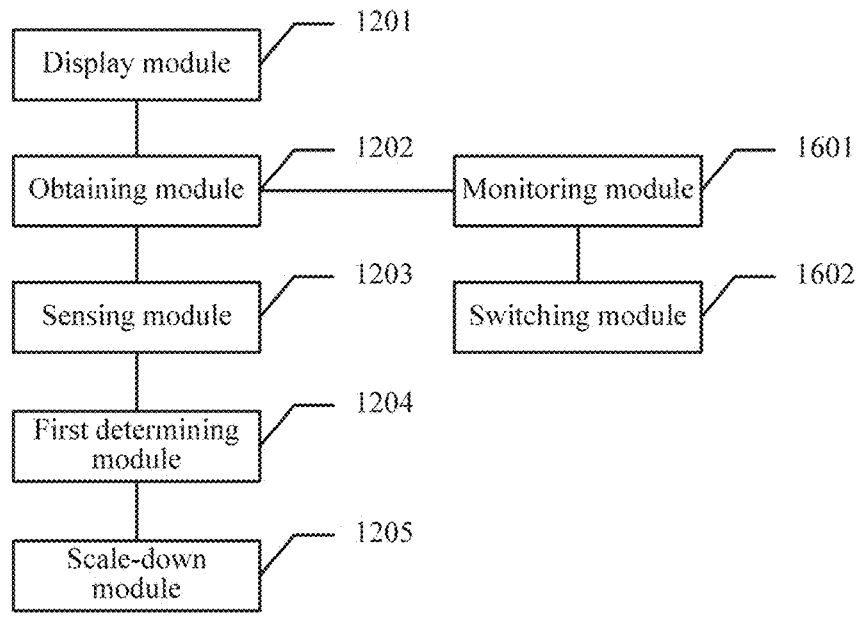
FIG. 16 is another schematic structural diagram of a mobile terminal according to an embodiment of the present disclosure.

In the foregoing embodiment, the effective display area is scaled down. In an actual application, the mobile terminal may further switch the scaled-down effective display area to a lower left corner or a lower right corner according to an oblique angle. Referring to FIG. 16, in another embodiment of the mobile terminal in the embodiments of the present disclosure, the foregoing mobile terminal further includes a monitoring module 1601, configured to when the first operation obtained by the obtaining module 1202 satisfies the preset condition, monitor a left-right levelness of the mobile terminal, where the left-right levelness represents an angle between the horizontal line and a line that is perpendicular to a left edge and a right edge of the mobile terminal, and a switching module 1602, configured to in a range of 0 degree to 180 degrees, when the left-right levelness is less than 90 degrees, switch the effective display area of the screen to a lower left corner of the screen, or when the left-right levelness is greater than 90 degrees, switch the effective display area of the screen to a lower right corner of the screen.

In this embodiment, the monitoring module 1601 detects the left-right levelness of the mobile terminal. The switching module 1602 switches the effective display area to the lower left corner or the lower right corner of the screen according to the detected left-right levelness, thereby improving interaction performance between the terminal and the user, and facilitating an operation of the user.

Figure 17:
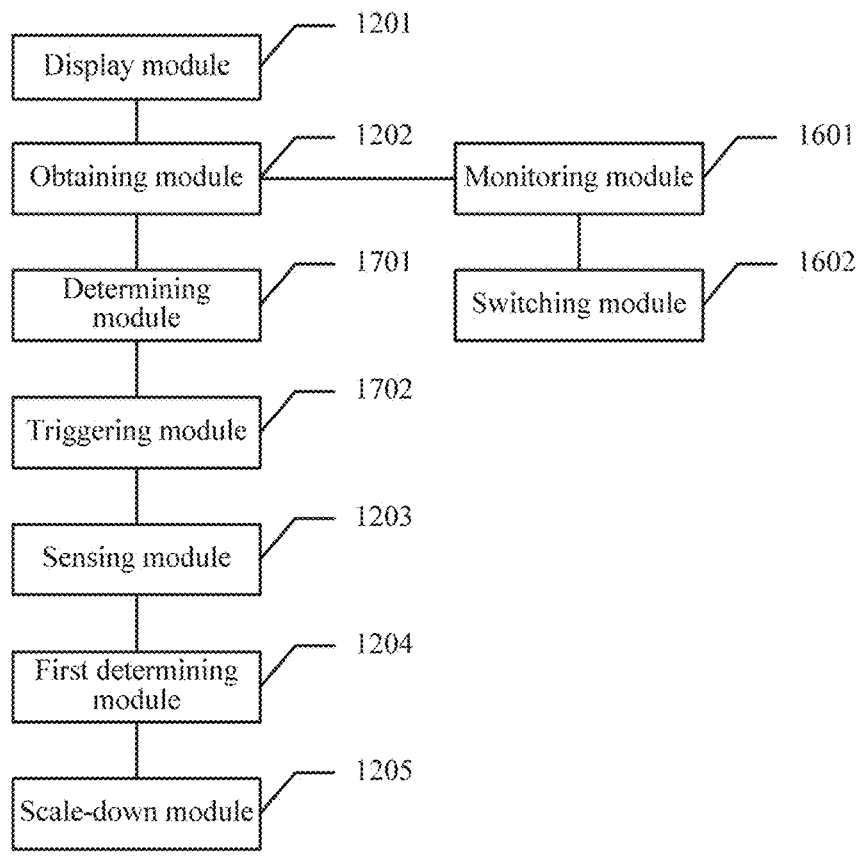
FIG. 17 is another schematic structural diagram of a mobile terminal according to an embodiment of the present disclosure.

In the foregoing embodiment, the obtaining module 1202 obtains the first operation. In an actual application, there may be multiple types of first operations. Optionally, referring to FIG. 17, in another embodiment of the mobile terminal in the embodiments of the present disclosure, the first operation is that the user constantly presses or performs floating touch on a first particular area at an edge of the screen of the mobile terminal.

The obtaining module 1202 is configured to obtain the operation that the user constantly presses or performs floating touch on the first particular area at the edge of the screen of the mobile terminal, and determine first duration, where the first duration is duration for which the user constantly presses or performs floating touch on the first particular area at the edge of the screen of the mobile terminal.

The mobile terminal further includes a determining module 1701, configured to determine whether the first duration determined by the obtaining module 1202 is less than preset duration, and a triggering module 1702, configured to when the determining module 1701 determines that the first duration is not less than the preset duration and determines that the first operation satisfies the preset condition, trigger the sensing module 1203.

In this embodiment, when the determining module 1701 determines that the duration that is obtained by the obtaining module 1202 and for which the user constantly presses or performs floating touch on the first particular area at the edge of the screen of the mobile terminal is not less than the preset duration, the triggering module 1702 triggers the sensing module 1203, which can trigger determining on a subsequent scaling proportion more conveniently.

Figure 18:
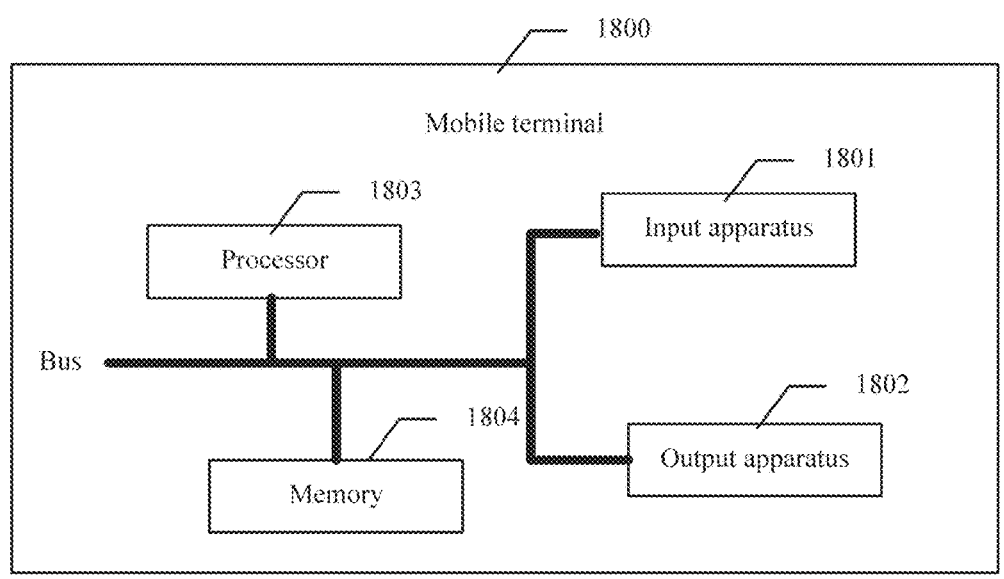
FIG. 18 is another schematic structural diagram of a mobile terminal according to an embodiment of the present disclosure.

Referring to FIG. 18, another embodiment of a mobile terminal 1800 according to the embodiments of the present disclosure includes an input apparatus 1801, an output apparatus 1802, a processor 1803, and a memory 1804 (there may be one or more processors 1803 in the mobile terminal 1800, and one processor 1803 is used as an example in FIG. 18). In some embodiments of the present disclosure, the input apparatus 1801, the output apparatus 1802, the processor 1803, and the memory 1804 may be connected using a bus or in another manner, and connection using a bus is used as an example in FIG. 18.

By invoking an operation instruction stored in the memory 1804, the processor 1803 is configured to perform the following steps displaying first content, obtaining a first operation, where the first operation is an operation performed by a single finger of a user on the mobile terminal, when the first operation satisfies a preset condition, sensing a second operation, where the second operation is a continuous operation performed by the user on the mobile terminal, determining, according to a preset correspondence, a scale-down proportion corresponding to the second operation, and continuously scaling down an effective display area of a screen of the mobile terminal according to the scale-down proportion such that the first content is displayed on a scaled-down effective display area.

In some embodiments of the present disclosure, the second operation is a continuous operation of a single finger of the user on a second particular area of the mobile terminal, and the preset correspondence is a correspondence between an extent of a continuous movement of the finger on the second particular area and a scaling proportion.

When performing the step of sensing the second operation, the processor 1803 performs the following steps sensing the continuous operation of the single finger of the user on the second particular area, and determining the extent of the continuous movement of the finger on the second particular area.

When performing the step of determining, according to the preset correspondence, the scaling proportion corresponding to the second operation, the processor 1803 performs the following step determining, according to the preset correspondence, a scale-down proportion corresponding to the extent of the continuous movement of the finger on the second particular area.

In some embodiments of the present disclosure, the second operation is an operation for changing an up-down levelness of the screen of the mobile terminal, the up-down levelness represents an angle between a horizontal line and a line that is perpendicular to an upper edge and a lower edge of the mobile terminal, and the preset correspondence is a correspondence between an angle change of the up-down levelness and a scale proportion.

When performing the step of sensing the second operation, the processor 1803 performs the following steps sensing the operation for changing the up-down levelness of the mobile terminal, and determining the angle change of the up-down levelness, and When performing the step of determining, according to the preset correspondence, the scaling proportion corresponding to the second operation, the processor 1803 performs the following step determining, according to the preset correspondence, the scaling proportion corresponding to the angle change of the up-down levelness.

In some embodiments of the present disclosure, when performing the step of determining, according to the preset correspondence, the scale-down proportion corresponding to the second operation, the processor 1803 performs the following step when a direction pointed by the second operation is a first direction, determining, according to the preset correspondence, the scale-down proportion corresponding to the second operation.

The processor 1803 is further configured to perform the following steps when the direction pointed by the second operation is a second direction, determining, according to the preset correspondence, a scale-up proportion corresponding to the second operation, where the second direction is different from the first direction, and continuously scaling up the effective display area of the screen of the mobile terminal according to the scale-up proportion such that the same content is displayed on a scaled-up effective display area, where the effective display area can at most be scaled up to a size that is the same as that of the screen.

In some embodiments of the present disclosure, the processor 1803 is further configured to perform the following step when a third operation is received, resetting the effective display area to a size that is the same as that of the screen, where the third operation is different from the first operation and the second operation.

In some embodiments of the present disclosure, the processor 1803 is further configured to perform the following steps when the obtained first operation satisfies the preset condition, monitoring a left-right levelness of the mobile terminal, where the left-right levelness represents an angle between the horizontal line and a line that is perpendicular to a left edge and a right edge of the mobile terminal, and in a range of 0 degree to 180 degrees, when the left-right levelness is less than 90 degrees, switching the effective display area of the screen to a lower left corner of the screen, or when the left-right levelness is greater than 90 degrees, switching the effective display area of the screen to a lower right corner of the screen.

In some embodiments of the present disclosure, the first operation is that the user constantly presses or performs floating touch on a first particular area at an edge of the screen of the mobile terminal.

When performing the step of obtaining the first operation, the processor 1803 performs the following steps obtaining the operation that the user constantly presses or performs floating touch on the first particular area at the edge of the screen of the mobile terminal, and determining first duration, where the first duration is duration for which the user constantly presses or performs floating touch on the first particular area at the edge of the screen of the mobile terminal.

The processor 1803 is further configured to perform the following steps determining whether the determined first duration is less than preset duration, and when determining that the first duration is not less than the preset duration, determining that the first operation satisfies the preset condition.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A method for scaling down an effective display area of a screen, comprising:
    displaying, by a mobile terminal, first content;
    obtaining, by the mobile terminal, a first operation, wherein the first operation is an operation performed by a single finger of a user on the mobile terminal;
    sensing, by the mobile terminal, a second operation when the first operation satisfies a preset condition, wherein the second operation is a continuous operation performed by the user on the mobile terminal;
    determining, by the mobile terminal according to a preset correspondence, a scale-down proportion corresponding to the second operation; and
    continuously scaling down, by the mobile terminal, an effective display area of a screen of the mobile terminal according to the scale-down proportion, wherein the first content is displayed on a scaled-down effective display area.

2. The method according to claim 1, wherein the second operation is a continuous operation of the single finger of the user on a particular area of the mobile terminal, wherein the preset correspondence is a correspondence between an extent of a continuous movement of the single finger on the particular area and the scale-down proportion, wherein sensing, by the mobile terminal, the second operation comprises:
    sensing, by the mobile terminal, the continuous operation of the single finger of the user on the particular area; and
    determining the extent of the continuous movement of the finger on the particular area, and
    wherein determining, by the mobile terminal according to the preset correspondence, the scale-down proportion corresponding to the second operation comprises determining, by the mobile terminal according to the preset correspondence, the scale-down proportion corresponding to the extent of the continuous movement of the single finger on the second particular area.

3. The method according to claim 2, wherein when the first operation satisfies the preset condition, the method further comprises:
    monitoring, by the mobile terminal, a left-right levelness of the mobile terminal, wherein the left-right levelness represents an angle between the horizontal line and a line that is perpendicular a left edge and a right edge of the mobile terminal; and
    switching, by the mobile terminal, the effective display area of the screen to a lower left corner of the screen in a range of 0 degree to 180 degrees when the left-right levelness is less than 90 degrees; and
    switching, by the mobile terminal, the effective display area of the screen to a lower right corner of the screen in the range of 0 degree to 180 degrees when the left-right levelness is greater than 90 degrees.

4. The method according to claim 2, wherein the first operation is at least one operation of the user constantly presses or performs floating touch on a first particular area at an edge of the screen of the mobile terminal, wherein obtaining, by the mobile terminal, the first operation comprises:
    obtaining, by the mobile terminal, the first operation that the user constantly presses or performs floating touch on the first particular area at the edge of the screen of the mobile terminal; and
    determining a duration, wherein the duration is a duration for which the user constantly presses or performs floating touch on the first particular area at the edge of the screen of the mobile terminal;
    determining, by the mobile terminal, whether the first duration is less than preset duration before determining the first operation satisfies the preset condition; and
    determining that the first operation satisfies the preset condition when determining that the first duration is not less than the preset duration.

5. The method according to claim 1, wherein the second operation is an operation for changing an up-down levelness of the screen of the mobile terminal, wherein the up-down levelness represents an angle between a horizontal line and a line that is perpendicular to an upper edge and a lower edge of the mobile terminal, wherein the preset correspondence is a correspondence between an angle change of the up-down levelness and a scale proportion, wherein sensing, by the mobile terminal, the second operation comprises:
    sensing, by the mobile terminal, the operation for changing the up-down levelness of the mobile terminal; and
    determining the angle change of the up-down levelness, and
    wherein determining, by the mobile terminal according to the preset correspondence, the scale-down proportion corresponding to the second operation comprises determining, by the mobile terminal according to the preset correspondence, the scale-down proportion corresponding to the angle change of the up-down levelness.

6. The method according to claim 5, wherein when the first operation satisfies the preset condition, the method further comprises:
    monitoring, by the mobile terminal, a left-right levelness of the mobile terminal, wherein the left-right levelness represents a second angle between the horizontal line and a line that is perpendicular to a left edge and a right edge of the mobile terminal; and
    switching, by the mobile terminal, the effective display area of the screen to a lower left corner of the screen in a range of 0 degree to 180 degrees when the left-right levelness is less than 90 degrees; and
    switching, by the mobile terminal, the effective display area of the screen to a lower right corner of the screen in the range of 0 degree to 180 degrees when the left-right levelness is greater than 90 degrees.

7. The method according to claim 5, wherein the first operation is at least one operation of the user constantly presses or performs floating touch on a first particular area at an edge of the screen of the mobile terminal, and wherein obtaining, by the mobile terminal, the first operation comprises:
    obtaining, by the mobile terminal, the first operation that the user constantly presses or performs floating touch on the first particular area at the edge of the screen of the mobile terminal;

determining a duration, wherein the duration is a duration for which the user constantly presses or performs floating touch on the first particular area at the edge of the screen of the mobile terminal;

determining, by the mobile terminal, whether the first duration is less than preset duration before determining the first operation satisfies the preset condition; and determining that the first operation satisfies the preset condition when determining that the first duration is not less than the preset duration.

8. The et according to claim 1, wherein determining, by the mobile terminal according to the preset correspondence, the scale-down proportion corresponding to the second operation comprises determining, by the mobile terminal according to the preset correspondence, the scale-down proportion corresponding to the second operation when a direction pointed by the second operation is a first direction, and wherein the method further comprises:

determining, by the mobile terminal according to the preset correspondence, a scale-up proportion corresponding to the second operation when the direction pointed by the second operation is a second direction, wherein the second direction is different from the first direction; and continuously scaling up, by the mobile terminal, the effective display area of the screen of the mobile terminal according to the scale-up proportion, wherein the same content is displayed on a scaled-up effective display area, and wherein the effective display area can at most be scaled up to a size that is the same as that of the screen.

9. The method according to claim 8, wherein when the first operation satisfies the preset condition, the method further comprises:

monitoring, by the mobile terminal, a left-right levelness of the mobile terminal, wherein the left-right levelness represents an angle between the horizontal line and a line that is perpendicular to a left edge and a right edge of the mobile terminal; and switching, by the mobile terminal, the effective display area of the screen to a lower left corner of the screen in a range of 0 degree to 180 degrees when the left-right levelness is less than 90 degrees; and switching, by the mobile terminal, the effective display area of the screen to a lower right corner of the screen in the range of 0 degree to 180 degrees when the left-right levelness is greater than 90 degrees.

10. The method according to claim 1, wherein after continuously scaling down the effective display area of the screen of the mobile terminal, the method further comprises resetting, by the mobile terminal, the effective display area to a size that is the same as that of the screen when the mobile terminal receives a third operation, wherein the third operation is different from the first operation and the second operation.

11. The method according to claim 1 wherein when the first operation satisfies the preset condition, the method further comprises:

monitoring, by the mobile terminal, a left-right levelness of the mobile terminal, wherein the left-right levelness represents an angle between the horizontal line and a line that is perpendicular to a left edge and a right edge of the mobile terminal;

switching, by the mobile terminal, the effective display area of the screen to a lower left corner of the screen in a range of 0 degree to 180 degrees when the left-right levelness is less than 90 degrees; and switching, by the mobile terminal, the effective display area of the screen to a lower right corner of the screen in the range of 0 degree to 180 degrees when the left-right levelness is greater than 90 degrees.

12. The method according to claim 1, wherein the first operation is at least one operation of the user constantly presses or performs floating touch on a particular area at an edge of the screen of the mobile terminal, and wherein obtaining, by the mobile terminal, the first operation comprises:

obtaining, by the mobile terminal, the first operation that the user constantly presses or performs floating touch on the particular area at the edge of the screen of the mobile terminal;

determining a duration, wherein the duration is a duration for which the user constantly presses or performs floating touch on the particular area at the edge of the screen of the mobile terminal;

determining, by the mobile terminal, whether the first duration is less than preset duration before determining the first operation satisfies the preset condition; and determining that the first operation satisfies the preset condition when determining that the first duration is not less than the preset duration.

13. A mobile terminal, comprising:
a memory configured to store operation instructions;
a processor that when executing the operation instructions stored in the memory is configured to:
display first content;
obtain a first operation, wherein the first operation is an operation performed by a single finger of a user on the mobile terminal;
sense a second operation when the first operation satisfies a preset condition, wherein the second operation is a continuous operation performed by the user on the mobile terminal;
determine, according to a preset correspondence, a scale-down proportion corresponding to the second operation; and
continuously scale down an effective display area of a screen of the mobile terminal according to the scale-down proportion, so that the first content is displayed on a scaled-down effective display area.

14. The mobile terminal according to claim 13, wherein the second operation is a continuous operation of the single finger of the user on a particular area of the mobile terminal, wherein the preset correspondence is a correspondence between an extent of a continuous movement of the single finger on the particular area and the scale-down proportion wherein when the processor senses the second operation, the processor is further configured to:

sense the continuous operation of the single finger of the user on the particular area; and determine the extent of the continuous movement of the finger on the particular area, and wherein when the processor determines, according to the preset correspondence, the scale-down proportion corresponding to the second operation, the processor is further configured to determine, according to the preset correspondence, the scale-down proportion corresponding to the extent of the continuous movement of the single finger on the second particular area.

15. The mobile terminal according to claim 13, wherein the second operation is an operation for changing an up-down levelness of the screen of the mobile terminal, wherein the up-down levelness represents an angle between a horizontal line and a line that is perpendicular to an upper edge and a lower edge of the mobile terminal, wherein the preset correspondence is a correspondence between an angle change of the up-down levelness and a scale proportion, wherein when the processor senses the second operation, the processor is further configured to:
  sense the operation for changing the up-down levelness of the mobile terminal; and
  determine the angle change of the up-down levelness, and wherein when the processor determines, according to the preset correspondence, the scale-down proportion corresponding to the second operation, the processor is further configured to determine, according to the preset correspondence, the scale-down proportion corresponding to the angle change of the up-down levelness.

16. The mobile terminal according to claim 13, wherein the processor determines, according to the preset correspondence, the scale-down proportion corresponding to the second operation, the processor is further configured to
  determine, according to the preset correspondence, the scale-down proportion corresponding to the second operation when a direction pointed by the second operation is a first direction;
  determine, according to the preset correspondence, a scale-up proportion corresponding to the second operation when the direction pointed by the second operation is a second direction, wherein the second direction is different from the first direction; and
  continuously scale up the effective display area of the screen of the mobile terminal according to the scale-up proportion, wherein the same content is displayed on a scaled-up effective display area, wherein the effective display area can at most be scaled up to a size that is the same as that of the screen.

17. The mobile terminal according to claim 13, wherein the processor is further configured reset the effective display area to a size that is the same as that of the screen when a third operation is received, wherein the third operation is different from the first operation and the second operation.

18. The mobile terminal according to claim 13, wherein the processor is further configured to:
  monitor a left-right levelness of the mobile terminal when the first operation satisfies the preset condition, wherein the left-right levelness represents an angle between the horizontal line and a line that is perpendicular to a left edge and a right edge of the mobile terminal; and
  switch the effective display area of the screen to a lower left corner of the screen in a range of 0 degree to 180 degrees when the left-right levelness is less than 90 degrees; and
  switch the effective display area of the screen to a lower right corner of the screen in the range of 0 degree to 180 degrees when the left-right levelness is greater than 90 degrees.

19. The mobile terminal according to claim 13, wherein the first operation is at least one operation of the user constantly presses or performs floating touch on a particular area at an edge of the screen of the mobile terminal, wherein when the processor obtains the first operation, the processors is further configured to:
  obtain the first operation that the user constantly presses or performs floating touch on the particular area at the edge of the screen of the mobile terminal;
  determine a duration, wherein the duration is a duration for which the user constantly presses or performs floating touch on the particular area at the edge of the screen of the mobile terminal;
  determine whether the determined first duration s less than preset duration; and
  determine that the first operation satisfies the preset condition when determining that the first duration is not less than the preset duration.

* * * * *

UNITED STATES PATENT AND TRADEMARK OFFICE
CERTIFICATE OF CORRECTION

PATENT NO. : 10,318,131 B2
APPLICATION NO. : 15/540779
DATED : June 11, 2019
INVENTOR(S) : Desheng Liang It is certified that error appears in the above-identified patent and that said Letters Patent is hereby corrected as shown below:

In the Claims

Column 25, Line 60: insert --to-- after "perpendicular"

Column 27, Line 11: "et according" should read "method according"

Column 30, Line 22: "the processors" should read "the processor"

Column 30, Line 31: "s less" should read "is less"

Signed and Sealed this
Twentieth Day of August, 2019

Andrei Iancu
*Director of the United States Patent and Trademark Office*